(12) United States Patent
Seilern

(10) Patent No.: US 10,636,092 B2
(45) Date of Patent: Apr. 28, 2020

(54) SYSTEM, METHOD, AND DEVICE FOR AUTONOMOUS FUND MANAGEMENT BY COMPUTER-BASED ALGORITHMS

(71) Applicant: Peter Seilern, Verbier (CH)

(72) Inventor: Peter Seilern, Verbier (CH)

(\*) Notice: Subject to any disclaimer, the term of this patent is extended or adjusted under 35 U.S.C. 154(b) by 0 days.

(21) Appl. No.: 16/556,311

(22) Filed: Aug. 30, 2019

(65) Prior Publication Data

US 2019/0385234 A1 Dec. 19, 2019

Related U.S. Application Data

(63) Continuation of application No. 15/367,235, filed on Dec. 2, 2016, now Pat. No. 10,445,831.

(51) Int. Cl.
*G06Q 40/00* (2012.01)
*G06Q 40/04* (2012.01)

(52) U.S. Cl.
CPC ............. *G06Q 40/04* (2013.01); *G06Q 40/00* (2013.01)

(58) Field of Classification Search
CPC .................................................... G06Q 40/00
See application file for complete search history.

(56) References Cited

U.S. PATENT DOCUMENTS

2011/0191229 A1\* 8/2011 Mittal .................... G06Q 40/04
705/37
2013/0332331 A1\* 12/2013 Toffey .................... G06Q 40/00
705/37

OTHER PUBLICATIONS

Francis M. Kinniry Jr., CFA and Sarah D. Hammer, Managing cash in your portfolio, Oct. 2012, Vanguard, web, 2-7 (Year: 2012).\*
Notice of Allowance dated Jun. 4, 2019 for U.S. Appl. No. 15/367,235.
Office Action dated Sep. 5, 2018 for U.S. Appl. No. 15/367,235.

\* cited by examiner

*Primary Examiner* — I Jung Liu
(74) *Attorney, Agent, or Firm* — Andre Roland S.A.; Nikolaus Schibli

(57) ABSTRACT

A method for autonomous fund management including the steps of selecting a certain number of securities to create a first group of securities from a publicly traded index, discarding securities from the first group based on filter criteria to create a second group of securities, categorizing the securities from the second group of securities to assign the securities to different industry sectors, grouping a predefined number of the categorized securities into a number n of security pools, such that each security in a same security pool is categorized to a same industry sector, and trading securities within the security pools, such that a first quantity of a first security within a pool is sold and a second quantity of a second security within the pool is purchased when a trade trigger is met, the trade trigger including an event when a ratio between a price of the first security and a price of the second security meets a predefined threshold.

20 Claims, 16 Drawing Sheets

| Figure 1 | | | Autonomous Fund Management | | | | | | |
|---|---|---|---|---|---|---|---|---|---|
| | | Traditionally-managed equity portfolio | | vs. | AFM-managed portfolio | | | | |
| | | | see attached Chart | | | | | | |

| | | | | | | AFM-managed | | | |
|---|---|---|---|---|---|---|---|---|---|
| Date | Dow | Portfolio increase/ decrease | less operating expenses | Portfolio year end | Increase | Portfolio | less admin. charge | less commission on AFM gain | Portfolio year end | Increase |
| | 16.3% | 16.3% | 1.4% | | | 28.4% | 0.25% | 40.0% | |
| 31 déc 05 | 10 718 | 10 000 000 | | | | 10 000 000 | | | |
| 31 déc 06 | 12 463 | 11 630 000 | -151 410 | 11 478 590 | 14.8% | 12 840 000 | -28 550 | -484 000 | 12 327 450 | 23.3% |
| | Total commissions | | -151 410 | | | | | -512 550 | | 238.5% |
| | Difference in portfolio values at year-end | | | | | | | | 848 860 | 8.5% |

Notes Chart shows a $10 million account
  i. with similar performance to the DJIA index and charged a 1.4% management commission.
  ii. AFM-managed (see Chart).
    A 0.25% administrative charge was deducted for AFM maintenance and supervision and a 40% commission solely on the outperformance achieved by AFM There are other ways of pricing AFM, this being only one.
Above results are summarized as follows:
  AFM-managed account did $848'860 better.
  Service provider's commissions rise from $151'410 to $512'550.  A $361'140 increase.

FIG. 2

|  |  | Bid | Ask | Volume MM | $ volume MM | B/A spread |
|---|---|---|---|---|---|---|
| CSCO |  | 16.65 | 16.69 | 42.3 | 705.14 | 0.24% |
| INTC |  | 19.50 | 19.55 | 56.7 | 1'107.07 | 0.26% |
| BRK/B | Berk. Hath. | 73'700.00 | 73'900.00 | 190 | 14.02 | 0.27% |
| IBM |  | 88.97 | 89.40 | 6.8 | 606.46 | 0.48% |
| SUNW |  | 4.31 | 4.34 | 60.2 | 260.37 | 0.70% |
| XOM | Exxon | 35.35 | 35.70 | 11.2 | 397.88 | 0.99% |
| MAS | Masco | 23.09 | 23.53 | 1.4 | 32.63 | 1.91% |
| LPX | Louis. Pac. | 8.57 | 9.08 | 0.7 | 6.18 | 5.95% |
| CDT | Cable Design | 5.80 | 6.33 | 0.34 | 2.06 | 9.14% |
| SOI | Solutia | 2.25 | 3.00 | 3.1 | 8.14 | 33.33% |
|  |  | Suggested filters | | 0.50 | 10.00 | 1.00% |

FIG. 6 a POOL holds 5'000 shares of A currently trading at $50 bid.

| Order entered @ time T0 | | Shares | | Quotes @ order entry | | Amount |
|---|---|---|---|---|---|---|
| Sell | | 5'000 | A | 50.00 | bid | 250'000 |
| Buy either | | 11'364 | B | 22.00 | ask | 250'000 |
| | | 4'464 | C | 56.00 | ask | 250'000 |
| | | 6'579 | D | 38.00 | ask | 250'000 |
| or | | 13'158 | E | 19.00 | ask | 250'000 |

@ 3% savings or $7'500 of the $250'000 average cash value.

B, C, D and E share amounts (11'364, 4'464, etc.) calculated automatically using Auto-quantity.

| Conditions met @ time T1 | | Shares | | Quotes @ cond. met | | Amount | Savings | Total savings | % |
|---|---|---|---|---|---|---|---|---|---|
| Sell | | 5'000 | A | 51.00 | bid | 255'000 | 5'000.00 | | |
| Buy either | | 11'364 | B | 22.50 | ask | 255'682 | -5'681.82 | -681.82 | -0.3% |
| | | 4'464 | C | 56.30 | ask | 251'339 | -1'339.29 | 3'660.71 | 1.5% |
| | | 6'579 | D | 38.90 | ask | 255'921 | -5'921.05 | -921.05 | -0.4% |
| or | | 13'158 | E | 18.80 | ask | 247'368 | 2'631.58 | 7'631.58 | 3.1% |

Note: When conditions are met, order is executed and the $255'000 proceeds of the sale go to the purchase of new shares. 13'571 shares of E are bought instead of 13'158 initially calculated.
Upon completion a Reverse Order is entered.

| Reverse Order @ time T1 | | Shares | | Quotes @ order entry | | Amount |
|---|---|---|---|---|---|---|
| Sell | | 13'571 | E | 18.79 | bid | 255'000 |
| Buy either | | 4'999 | A | 51.01 | ask | 255'000 |
| | | 11'328 | B | 22.51 | ask | 255'000 |
| | | 4'529 | C | 56.31 | ask | 255'000 |
| or | | 6'554 | D | 38.91 | ask | 255'000 |

@ 3% savings or $7'850 of the $255'000 average cash value.

A, B, C and D share amounts (5'000, 11'333, etc.) calculated automatically.

| Conditions met @ time T2 | | Shares | | Quotes @ cond. met | | Amount | Savings | Total savings | % |
|---|---|---|---|---|---|---|---|---|---|
| Sell | | 13'571 | E | 19.17 | bid | 260'157 | 5'157.00 | | |
| Buy either | | 4'999 | A | 52.00 | ask | 259'949 | -4'949.03 | 207.97 | 0.1% |
| | | 11'328 | B | 22.26 | ask | 252'166 | 2'832.07 | 7'989.07 | 3.1% |
| | | 4'529 | C | 56.00 | ask | 253'598 | 1'403.84 | 6'560.83 | 2.6% |
| | | 6'554 | D | 38.60 | ask | 252'968 | 2'031.61 | 7'188.61 | 2.8% |

Upon completion a second Reverse Order is entered.

| 2nd Reverse Order @ time T2 | | Shares | | Quotes @ order entry | | Amount |
|---|---|---|---|---|---|---|
| Sell | | 11'715 | B | 22.25 | bid | 260'157 |
| Buy either | | 5'002 | A | 52.01 | ask | 260'157 |
| etc. | | etc. | C | 56.01 | ask | 260'157 |
| | | | D | 38.61 | ask | |
| | | | E | | ask | etc. |

FIG. 7A

|  |  |  | Example |
|---|---|---|---|
| No. of A shares to be sold | N1 |  | 1'000 |
| No. of B shares to be bought | N2 |  | 1'500 |
| Bid price of A at order entry | P1 |  | 30.00 |
| Ask price of B at order entry | P2 |  | 20.00 |
| Average cash value of transaction | $ACV = (N1*P1 + N2*P2)/2$ | (constant) | 30'000.00 |
| Bid price of A during monitoring | P3 |  | 30.20 |
| Ask price of B during monitoring | P4 |  | 19.70 |
| Requested savings in % | RS% | (constant) | 2.0% |
| Requested $ savings | $RS = S\% * (N1*P1 + N2*P2)/2$ | (constant) | 600.00 |
| Actual savings in % | $AS\% = ((N1*P3 - N2*P4) - (N1*P1 - N2*P2))/((N1*P1 + N2*P2)/2)$ |  | 2.2% |
| Actual $ savings | $AS = (N1*P3 - N2*P4) - (N1*P1 - N2*P2)$ |  | 650.00 |

1. Order is executed at market when    $AS\% \geq RS\%$   or   $AS \geq RS$

2. Share A goes ex-dividend

| Dividend | DA |  | $1.00 |
|---|---|---|---|
| Bid price of A during monitoring | P3ex |  | 29.20 |
| Ask price of B during monitoring | P4 |  | 19.70 |
| Actual savings | $AS = (N1*(P3ex + DA) - N2*P4) - (N1*P1 - N2*P2)$ |  | 650.00 |

3. Share B goes ex-dividend

| Dividend | DB |  | $1.00 |
|---|---|---|---|
| Bid price of A during monitoring | P3 |  | 30.20 |
| Ask price of B during monitoring | P4ex |  | 18.70 |
| Actual savings | $AS = (N1*P3 - N2*(P4ex + DB)) - (N1*P1 - N2*P2)$ |  | 650.00 |

Dividend added back to bid or ask price (P3ex or P4ex) on ex-dividend date.

4. Stock split under 10% calculated as a dividend (see above)

| Stock split | Split = D |  | 7% |
|---|---|---|---|
|  | D |  | $2.10 |

5. Stock A split over 10%

| Stock A is split 2 for 1 | Sp.A | (2 for 1) | 200% |
|---|---|---|---|
| Bid price of A during monitoring | P3sp.A |  | 15.10 |
| Ask price of B during monitoring | P4 |  | 19.70 |
| Actual $ savings | $AS = (N1*P3sp.A*Sp.A - N2P4) - (N1*P1 - N2*P2)$ |  | 650.00 |
| Note: | N1*Sp.A shares are sold |  |  |

6. Stock B split over 10%

| Stock B is split 2 for 1 | Sp.B | (2 for 1) | 200% |
|---|---|---|---|
| Bid price of A during monitoring | P3 |  | 30.20 |
| Ask price of B during monitoring | P4sp.B |  | 9.85 |
| Actual $ savings | $AS = (N1*P3 - N2*P4sp.B*Sp.B) - (N1*P1 - N2*P2)$ |  | 650.00 |
| Note: | N2*Sp.B shares are bought |  |  |

Number of shares at order entry (N1 or N2) multiplied by split factor (Sp.A or Sp.B).

FIG. 7B

| Examples | Sell | 600 | @ | 45.00 | 27'000.00 |
| | Buy | ?? | | 22.00 | |
| | | | | | |
| | Exact number of buy shares | | | 1'227 | |
| | Rounded number | | | 1'200 | 26'400.00 |
| | | | | net | 600.00 |
| | | | | | |
| | Sell | 2'000 | @ | 75.00 | 150'000.00 |
| | Buy | ?? | | 22.00 | |
| | | | | | |
| | Exact number of buy shares | | | 6'818 | |
| | Rounded number | | | 6'800 | 149'600.00 |
| | | | | net | 400.00 |
| | | | | | |
| | Sell | 200 | @ | 34.00 | 6'800.00 |
| | Buy | ?? | | 25.00 | |
| | | | | | |
| | Exact number of buy shares | | | 272 | |
| | Rounded number | | | 300 | 7'500.00 |
| | | | | net | -700.00 |

FIG. 8

|   |   | A = Alphanumeric |   |   |   |
|---|---|---|---|---|---|
|   |   | B = Numeric |   |   |   |
| A. Master Security File (MSF) | | Bytes | Symb. in algorythm | | |
| Security symbol | | A | 12 | | extended |
| Security type | | A | 1 | | Common, (pfrd, wrnts, optns.) |
| Quotes, last | | | | | |
| | Bid price | N | 2 | P1 | |
| | Bid size | N | 3 | | |
| | Ask price | N | 2 | P2 | |
| | Ask size | N | 3 | | |
| | Time | N | 2 | | HHMM |
| | Exchange ID | | 1 | | |
| | Suspect flag | | 1 | | Quote failed validation test |
| | Entry date | | 2 | | YYMMDD |
| Last sale price | | N | 3 | | Cross-check for bid/ask error |
| 20-day volatility | | N | 2 | | |
| Exchanges traded | | A | 1 | | |
| Average daily volume | | N | 3 | | |
| Trading halt indicator | | A | 1 | | |
| | | Total | 36 | | |

FIG. 9

|  |  | | Symb. in | |
|---|---|---|---|---|
|  |  | A | = Alphanumeric | |
|  |  | N | = Numeric | |
| B. | Pending Order File (POF) | | Symb. in algorythm | |
| | End user | | | |
| | User name | A | ? | |
| | E-mail address | A | ? | |
| | Registered | A | ? | |
| | User password | A | ? | |
| | Brokerage firm/service provider | | | |
| | Website | A | ? | |
| | Brokerage firm/service provider | A | ? | |
| | Branch number | N | 2 | |
| | AE number | N | 2 | |
| | Account number | N | 3 | |
| | Order | | | |
| | Order number | N | 2 | |
| | Trade type | A | 1 | nT, sL buy & sell |
| | Country | A | ? | |
| | Sell security symbol | A | 12 | |
| | Sell security quantity | N | 2 | N1 |
| | Buy security symbol | A | 12 | |
| | Buy security quantity | N | 2 | N2 |
| | Savings, requested (%) | N | ? | S |
| | Savings, requested (cash) | N | ? | RS |
| | Average cash value | N | ? | ACV |
| | Upper trading limit | N | ? | smartLIMIT buy |
| | Lower trading limit | N | ? | smartLIMIT sell |
| | Probability of execution | N | 2 | |
| | Entry date/time | | | |
| |     Date/time | N | 2 | |
| |     Bid price | N | 2 | P1 |
| |     Buy exchange | A | 1 | |
| |     Ask price | N | 2 | P2 |
| |     Sell exchange | A | 1 | |
| | Order flow directions | N | 1 | generate order or advice |
| | Cancellation code | A | 1 | |
| | Expiration date | N | 2 | |
| | Sell commission code | A | 2 | |
| | Sell commission rate | N | 2 | |
| | Buy commission code | A | 2 | |
| | Buy commission rate | N | 2 | |
| | Surcharge | N | ? | |
| | Various | | | |
| | P&S instructions | A | 8 | |
| |     Dividend adjust indicator | N | 1 | |
| |     Dividend rate | N | 2 | |
| |     Dividend type | A | 1 | |
| |     Dividend ex date | N | 2 | |
| | | Total | ? | |

FIG. 10

| P1 | Semiconductors | | P2 | Major Drugs II |
|---|---|---|---|---|
| TXN | Texas Instruments | | PFE | Pfizer |
| ADI | Analog Devices | | LLY | Lilley |
| MSFT | Microsoft | | ABT | Abbott Laboratories |
| AMAT | Applied Materials | | JNJ | Johnson & Johnson |
| CSCO | Cisco | | AZN | Astra Zeneca |

| P3 | Major Drugs | | P4 | Household Products |
|---|---|---|---|---|
| BAY | Bayer | | CLX | Clorox |
| BMY | Bristol Myers | | G | Gillette |
| GSK | Glaxo Smith Kline | | AVP | Avon Products |
| PFE | Pfizer | | PG | Proctor & Gamble |
| ABT | Abbott Laboratories | | CL | Colgate |

| P5 | Food Processing | | P6 | Oil & Gas integrated |
|---|---|---|---|---|
| HNZ | Heinz | | XOM | Exxon Mobil |
| GIS | General Mills | | BP | BP plc |
| K | Kellogg | | CVX | Chevron Texaco |
| KFT | Kraft | | RD | Royal Dutch |
| SLE | Sarah Lee | | SC | Shell Transport & Trading |

| P7 | Banks | | P8 | Software |
|---|---|---|---|---|
| WFC | Wells Fargo | | CA | Computer Associates |
| JPM | JP Morgan | | ORCL | Oracle |
| BAC | Bank of America | | BEAS | BEA Systems |
| C | Citicorp | | SYM | Symantec Corp. |
| BK | Bank of New York | | ADBE | Adobe Systems |

| P9 | Energy Services | | P10 | Business services |
|---|---|---|---|---|
| DUK | Duke Energy | | ADP | Automatic Data Processing |
| AEP | American Electric Power | | ACN | Accenture Ltd. |
| D | Dominion Resources | | PAYX | Paychex |
| ETR | Entergy Corp. | | YHOO | Yahoo |
| EXC | Excelon | | FDC | First Data Corp. |

| P11 | Major Brokerages | | P12 | Online Brokerages |
|---|---|---|---|---|
| MWD | Morgan Stanley | | LM | Legg Mason |
| MER | Merrill Lynch | | AMTD | Ameritrade |
| GS | Goldman Sachs | | BSC | Bear Stearns |
| LEH | Lehmann Brothers | | TROW | T Rowe Price |
| SCH | Charles Schwab | | ET | Etrade |

SYSTEM, METHOD, AND DEVICE FOR AUTONOMOUS FUND MANAGEMENT BY COMPUTER-BASED ALGORITHMS

CROSS-REFERENCE TO RELATED APPLICATIONS

The present application is a continuation application (CONT) of application Ser. No. 15/367,235, published as U.S. Pat. Pub. No. 2017/0161830, that was filed on Dec. 2, 2016, and claims foreign priority to International patent application with the Serial No. PCT/IB2015/059286, filed on Dec. 2, 2015, the entire contents of both these documents being herewith incorporated by reference.

FIELD OF THE INVENTION

The present invention is directed to the field of automatic and autonomous computer-controlled management and trading of investment portfolios and funds to increase the financial performance of the funds in comparison with trading indexes.

BACKGROUND

In the field of fund and portfolio management for investors, professional fund managers that try to provide for above-average performance for their portfolio for investing clients rely heavily on market research and financial analysis and securities analysis, to gather specific knowledge and predictions so that they can predict better performance for certain types of securities. The costs of the research and the management of such portfolio with such analysis are usually borne by the client, usually as fees or in a yearly percentage that is calculated based on the monetary value of the portfolio during the year. Also, in providing portfolio management services, often fund managers refer to speculative investment strategies, that can be overly risky. In addition, trading activities are often subject to legal scrutiny for alleged insider trading, based on the activities of the fund managers. Generally, the traditional way of portfolio management is costly and requires substantial human intervention, to update certain portfolio positions during the lifetime of the portfolio.

In light of the above described disadvantages, novel automatic fund management systems, methods, and devices are desired, that do not require substantial management and analysis cost overhead, that are non-speculative, and can be performed in an automated way by a computerized system.

SUMMARY

According to one aspect of the present invention, a method for performing an automated fund management is provided, performed on a hardware processor of a computer that has access via the Internet to a financial trading service. Preferably, the method includes the steps of selecting a certain number of securities to create a first group of securities from a publicly traded index, discarding securities from the first group based on filter criteria to create a second group of securities, and categorizing the securities from the second group of securities to assign the securities to different industry sectors. In addition, the method further preferably includes the steps of grouping a predefined number of the categorized securities into a number n of security pools, such that each security in a same security pool is categorized to a same industry sector, and trading securities within the security pools, such that a first quantity of a first security within a pool is sold and a second quantity of a second security within the pool is purchased when a trade trigger is met, the trade trigger including an event when a ratio between a price of the first security and a price of the second security meets a predefined threshold.

According to another aspect of the present invention, a system for autonomous fund management is provided. Preferably, the system includes a hardware computer having access to online financial trading service, and a display screen. In addition, preferably, the hardware computer is configured to select a certain number of securities to create a first group of securities from a publicly traded index, discard securities from the first group based on filter criteria to create a second group of securities, categorize the securities from the second group of securities to assign the securities to different industry sectors, and group the categorized securities from the second group of securities into a set of security pools, each security in a same security pool assigned to a same category of securities.

Moreover, the hardware computer is further preferably configured to, during a trading period, trade securities within the security pools, such that a first quantity of a first security within a pool is sold and a second quantity of a second security within the pool is purchased when a trade trigger is met, the trade trigger including an event when a ratio between a price of the first security and a price of the second security meets a predefined threshold.

According to yet another aspect of the present invention, a non-transitory computer readable medium is provided, the non-transitory computer readable medium having computer instructions recorded thereon, the computer instructions configured to perform a method for autonomous fund management when executed on a hardware computer. Preferably, the hardware computer has access to an online financial trading service, and the performed method preferably includes the steps of selecting a certain number of securities to create a first group of securities from a publicly traded index, discarding securities from the first group based on filter criteria to create a second group of securities, categorizing the securities from the second group of securities to assign the securities to different industry sectors, and grouping a predefined number of the categorized securities into a number n of security pools, such that each security in a same security pool is categorized to a same industry sector.

Moreover, the method preferably further includes the step of trading securities within the security pools, such that a first quantity of a first security within a pool is sold and a second quantity of a second security within the pool is purchased when a trade trigger is met, the trade trigger including an event when a ratio between a price of the first security and a price of the second security meets a predefined threshold.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2 shows the monetary performance of the managed fund compared to the Dow Jones index and another fund managed by background art solutions, including the operating and commission expenses;

FIG. 6 depicts an exemplary table showing the results of a filter that is applied to a first group of securities to obtain a second group of securities based on the filter criteria;

FIG. 7A shows an automated trading example and FIG. 7B shows an exemplary table that shows six different scenarios of trades performed by the autonomous fund management;

FIG. 8 shows an exemplary table that shows another aspect for calculating a number of securities that is purchased upon a sale;

FIG. 9 shows an exemplary data set for a master security file that can be created for each security that is gathered into the first group of securities;

FIG. 10 shows an exemplary data set of a pending order file to show data that is associated with an order that can be used to set up an order with an e-trading service;

FIG. 11 shows an exemplary data set showing twelve different pools of shares with securities from the second data set;

FIG. 14 shows an exemplary prompt or message that can be generated by the system for alerting a user on actual saving reaching a certain level above the requested savings.

Herein, identical reference numerals are used, where possible, to designate identical elements that are common to the figures. Also, the images in the drawings are simplified for illustration purposes and may not be depicted to scale.

DETAILED DESCRIPTION OF THE PREFERRED EMBODIMENTS

The system, method, and device for performing the autonomous fund management according to one aspect of the present invention employs an autonomous fund management (AFM) procedure for the digital marketplace which does not rely on traditional financial research and analysis. In the following specification, aspects of the present invention will be referred to as the system, however, the invention can be implemented as well as a method, a device, and also a non-transitory computer readable medium. Instead, the present system uses computer-based algorithms, calculations, rules and safety nets to achieve better trading results. The system replaces market and financial research and analysis with mathematical formulae operated on a computerized system, the system capable of running on a hardware processing device, for example a server system such as an SQL server that is connected to various data resources over the Internet. The procedure can operate autonomously without human intervention. One of the goals of the system to performing the autonomous fund management is to outperform major market indexes by 1% a month in a risk-free and financially stable environment. Series of experimental results have confirmed the outperformance of the markets.

Figure 1:
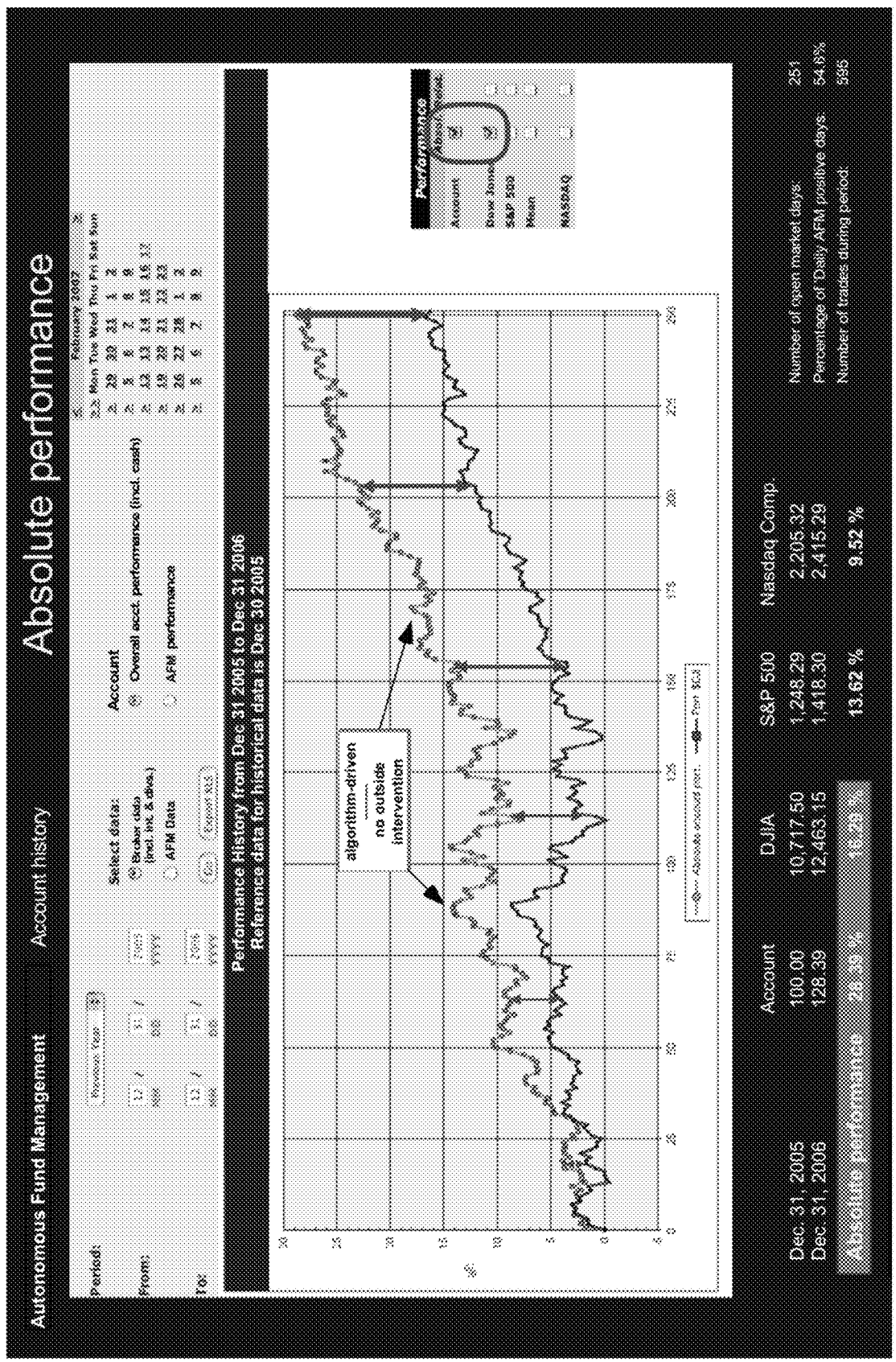
FIG. 1 shows a representation of a screenshot from a graphical user interface generated by the system showing the absolute trading performance of the managed fund against the Dow Jones index.

According to an aspect of the present invention, the system allows to use short-term random movements of stock prices during one or more trading days that are used to get better trading conditions when selling a first stock with the purpose to buy a second different stock. Since the early 2000s, online databases, real-time quotes, web-based trading, application program interface (API) links to various online and real-time data sources and low commission rates were introduced to the marketplace. Based on the availability of online data and the computer-based access thereto, the present system has been developed that combines a series of computer-based algorithms and rules to implement a method for a computer-based autonomous portfolio management tool. For example, during a full year of experimental non-public testing, an account that managed the trading according to the present system outperformed some of the major market indexes, for example the Dow Jones, S&P500 and NASDAQ by 12.1%, 14.8% and 18.9% respectively, as shown in FIG. 1.

The present system for performing the autonomous fund management is different from existing asset management solutions, and is also completely different from traditional trading practices. The proposed system can outperform a market index by extracting relatively small gains from short-term anomalies in stock prices and quotes during one or more trading days, and runs entirely automatized without human intervention. Upon occurrence of certain unexpected events, the system can be configured to generate a user warning message or prompt, so that a manual intervention can be allowed, for example but not limited to mergers, splits, International Securities Identification Number Changes (ISIN), profit warnings, removal of securities from stock exchange, major price movements. As can be seen in FIG. 1, an absolute performance chart is shown that details how the present system can achieve specific superior results as compared to background methods, and preforms with superior results on a daily basis over a full year. It is shown how the performance of an account and portfolio managed by the present system gradually and steadily drifts apart from the Dow Jones financial index, thereby outperforming a major market index. The system is operable on both United States trading indexes and International ones.

For example, it can be seen that the percentage of "Daily AFM" positive days is at 54.6% which means that out of the 251 days the New York Stock Exchange (NYSE) was open, the present system actually outperformed the market on 137 days and underperformed on 114 days. Moreover, during that same time period, the present system executed on average 4.7 trades a day, and each trade was in a range between $50 to $100,000. Moreover, in most common e-banking platforms, commissions ran at approximately $4 per trade, which is a negligible factor given the average size of the trades. Also, when using the procedure, the Security Exchange Commission (SEC) fees were also taken into account to calculate the performance.

According to an aspect of the present invention, the system provides of an entirely different approach to manage and valorize an investment portfolio. It is capable of removing subjectivity from the purchase and sale process, and apart from the initial choice of compatible securities, no market and securities research needs to be undertaken. The procedure depends entirely on computer-based algorithms, safety nets and alerts, and the experimental results discusses above show that the managed portfolios are turned over at above the accepted rate, and that the managed portfolios have outperformed the common market indexes at a regular pace. Commonly, with background art solutions, institutions that provide portfolio and/or fund management services, with the exception of index funds, use research to determine their investment strategy, and such research is expensive and due to market complexity and unforeseeable events, the results remain uncertain. Moreover, management commissions and expenses reduce the value of a portfolio by between 1.0% and 1.5% a year, which is one reason why investors shy away from portfolio and fund management provides and turn to indexed funds where fees are lower. The present system takes advantage of short-term movements of share prices, for example with a time period of one to several minutes, that are due to trading activity, and that are not based on market fundamentals. Therefore, on a daily basis, small savings that can be accumulated over a certain time period, by using these short-term movements.

The present system has been tested with experiments with a portfolio of about $7 million. A single portfolio managed by the system, method and device relative to a particular index could be as high as $50 million without affecting performance. Moreover, similar portfolios relative to the same index can be set up concurrently by changing internal parameters, and managed by the present system. It is therefore possible that the accounts that are managed by the present system could outperform one particular index with maybe $100-$200 million. Moreover, according to another aspect of the present invention, the system can be adapted to any situation where real-time electronic quotes and trading facilities can be accessed, for example via online services for example but not limited to an API of a e-trading company or bank. Also, the present system can be used to outperform a whole range of domestic and foreign sector indexes.

Moreover, the present system, as a function of which index the managed fund is set to outperform, different stocks, shares or other securities can be traded. A group of tradable securities are filtered, sorted, and organized, and these selected securities are fed to a database and traded through an API via an e-trading partner. The system uses interactive trading algorithms that interactive trading algorithms for trading decisions, will use specific algorithms to handle savings and losses, uses correction and updating formulae. The system allows for adaptation of positive values, general date and time adjustments, and alerts and safety nets that follow specific rules and algorithms can put the trading on hold, for example by requesting human intervention. In addition, via an API, the system can stop the automatic trading and put the trading on hold, and prompt of a user intervention after the detection of different criteria, such as but not limited to inaccurate or unreasonable stock prices, unexpected swings in markets and quotes within a certain range, trading halted by either the stock exchange market or the stock itself, changes in ISIN symbols, mergers.

Generally, the system according to another aspect of the present invention can be configured and operated by a service provider or a brokerage firm that manages portfolio accounts of several clients, for example a bank that manages retirement accounts, investment accounts, but can also be operated directly by a private individual to manage his own account. It can be configured such that both the investor, for example the clients of the service provider, and the service provider that operates the system, method and device. For example, given a $10 million portfolio of an investor's account with exactly the same performance as that shown in FIG. 2, the first the portfolio is managed in the traditional manner with a performance similar to the Dow Jones Industrial Index (DJIA) and second, the portfolio is managed with the present system, method and device. It is shown that the DJIA increased by 16.3%, while the portfolio managed by the present system, method or device increased by 28.4%. Moreover, the traditionally managed portfolio increased by 14.8% after a 1.4% commission charge, to reach the value of $151'410. Its value would have increased by $1.478 million net. In contrast thereto, the portfolio managed by the present system would have increased by $2.327 million net and have been charged $512'550 in commissions and administrative charges, given a fixed fee per trade. It can be seen that for both the investor and the service provider, the system can be beneficial to both, however, the $10 million portfolio would have a net gain of $848'860 as compared to the background art method of managing a portfolio that follows the DIJA index, and the management fees increased more than three-fold from $151'410 to $512'550.

In background art fund management methods, research represents a large portion of operating expenses in traditional fund management. This cost is passed on to investors in the form of fees and commissions. Certain institutions practice intrinsic value investing, attempting to capitalize on discrepancies between a market price of a security and the estimate of fair value in the present or the future. Such mispricing provides opportunities for active managers with specialist knowledge to outperform. In contrast thereto, the present system uses an algorithm-driven approach that excludes any subject determination and analysis. Also, the system operates on a non-speculative basis, as no shorts, no margins, no arbitrage, no options and no high frequency trading is performed. Basically, the system can invest in selected stocks and securities, or categories of stocks and securities that have long positions in blue chips and a cash reserve. Moreover, the system operates also on a market-neutral basis, as it performs equally well in bull as in bear markets, and the experimental results have shown that the best results are achieved when markets are active. Furthermore, it has been shown that the system can be configured to generate revenue for the service provider by a trading commission between $3 to $4 per trade, and have shown to represent a negligible amount compared to the savings generated by each transaction. When trading in the United States, SEC fees represent a slightly higher cost than trading commissions.

Figure 3A:
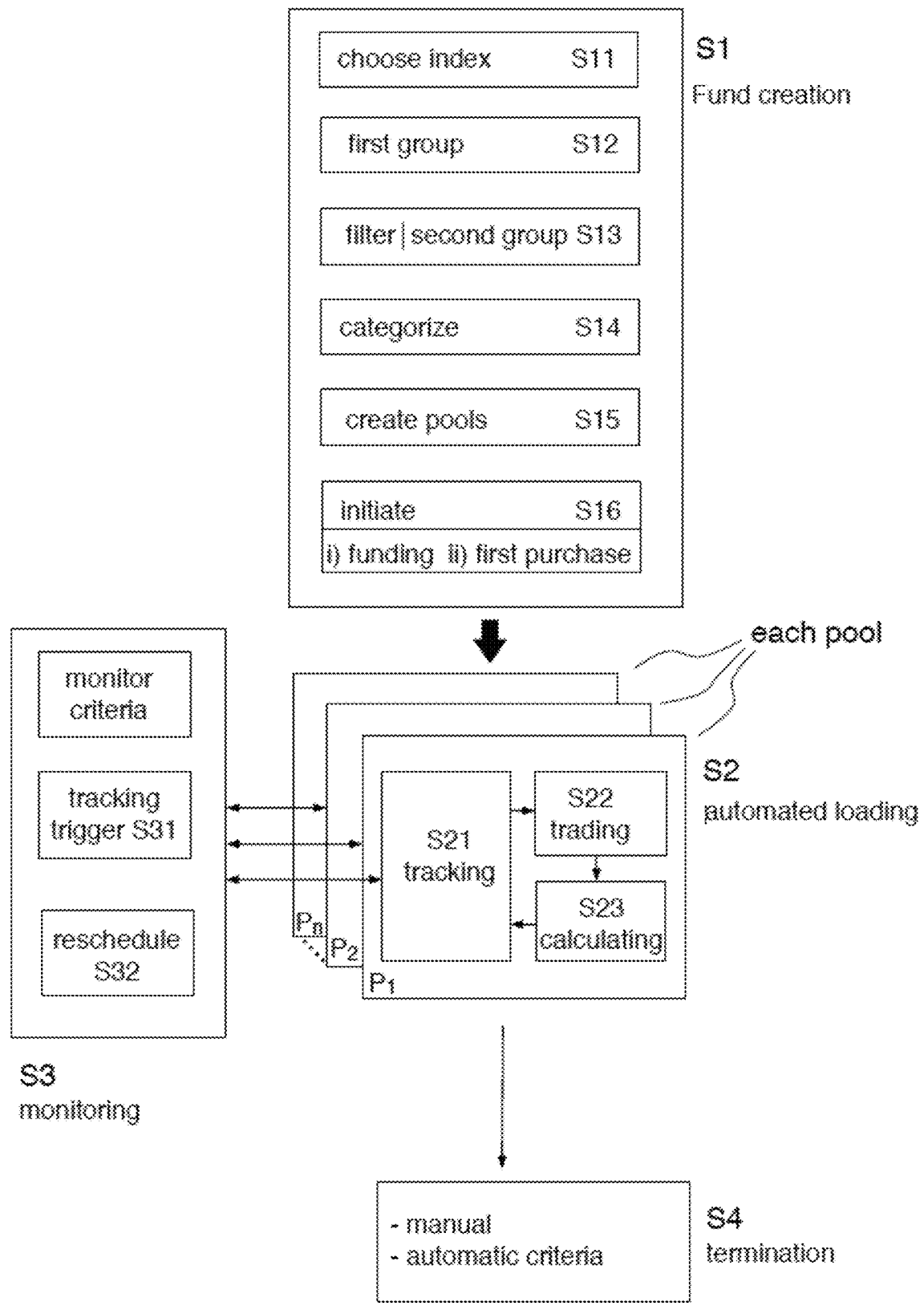
FIG. 3A shows an exemplary flowchart of a method for performing the autonomous fund management.
Figure 3B:
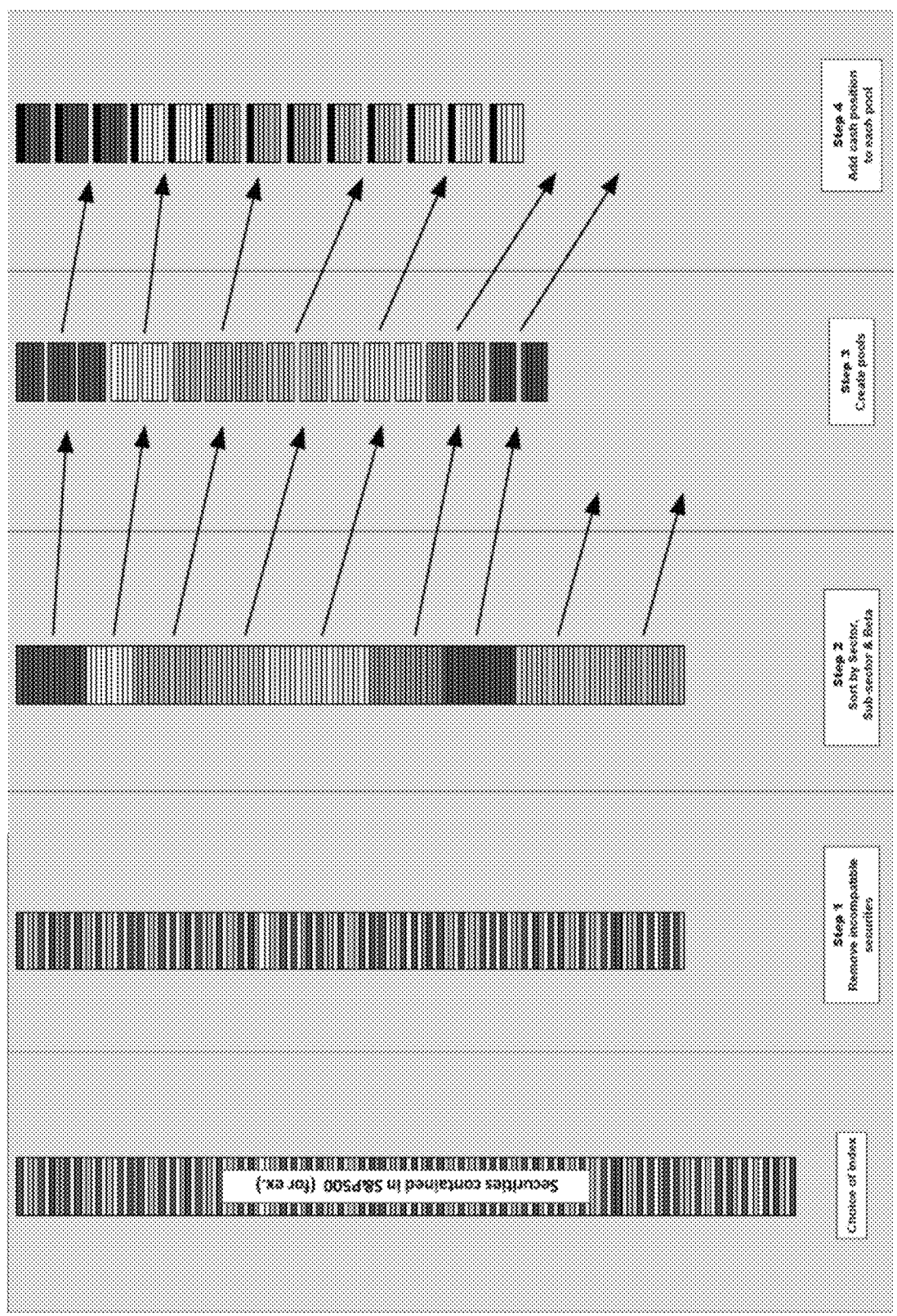
FIG. 3B shows a selection process to create pools, according to one aspect of the present invention.

Next, according to another aspect of the present invention, a method is provided for automated fund management, as schematically shown in FIG. 3A. In a first step S1, the portfolio for automated fund management (AFM) is created. This first step S1 is also schematically shown in FIG. 3B. This step sets up the basis for the AFM. This includes a couple of substeps. In a first substep S11, the user 20, which can be an investor himself or an operator of the system 100, for example a person with expertise in securities trading, chooses a trading index that the portfolio should outperform. For example, the user 20 can choose different trading indexes that are publicly traded, for example S&P 500, S&P 100, DJIA, FTSE, Nasdaq, SMI, Hong Kong Hang Seng, Nikkei 225, CAC 40, Frankfurt DAX, Russell 2000, or other publicly traded indexes. In a second substep S12, a list is established consisting of securities from that chosen index, to create a first group of securities. This list can be saved as a data structure in local or cloud memory. This can be done by a user or an automated process who selects securities based on certain criteria to select specific securities for a pool of securities, for example with the goal to create a diversified portfolio.

Next, in a third substep S13, securities from the first group are sorted and filtered to be removed by device 10, to create a second group of securities. This substep requires filtering and sorting all securities in the index to end up with a list of tradable securities that belong to the second group of securities, and the second group of securities provides for a further refinement of securities that can be used for the AFM. The goal is to generate a short list of securities, the second group of securities that is smaller than the first group of securities. For example, the third substep S13 can be done by the applying predetermined elimination criteria with device 10 to the securities of the first group, for example by elimination of certain securities from the first group based on the following criteria: (i) Removal of securities with a volatility outside a predefined range. For example, securities can have a volatility that is either too high too low that would be a risk for the stability of the AFM. The acceptable volatility can be defined as being within a certain range, for example above and below a lower and upper threshold of volatility that can be expressed in an average or median daily, weekly, or monthly percentage change in monetary value, respectively. (ii) Removal of securities that are untradeable. For example, securities can be removed from the first group that have insufficient average daily volume, for example when the average market value of the daily traded volume is less than a certain threshold, i.e. the traded market volume per day needs to be at least twenty times the size of the security that is in the AFM pool, removes securities that are penny stock, removes securities in which a trade would affect subsequent bid and ask quotes. (iii) Removal of securities that would, when traded, affect the stock price. For example, securities are removed for which a sale or purchase would have an effect on the overall ask and bid price when they are traded, for example but not limited to securities that have a very high unit price. It is important for the AFM that a sale or a purchase of a security in the AFM pool is unnoticed. For example, system 100 can access online portals of associations or institutions that include securities registration data and other type of securities data, that allows to perform the elimination. For example, the S&P database on securities or the SEC can be accessed via data services 50, to gather the relevant information.

For step S13, other rules can be applied to the filter, for example shares can be filtered by an amount of shares being publicly traded, share price, bid/ask spread, market marker. FIG. 6 show the results of a filter that has been applied to ten securities in the first group that have been reduced to six (6) securities in the second group. Securities that have a trading volume below a certain threshold, in the variant shown below a daily trade volume of $10M have been discarded, based on the step S13, (i). Also, the filter algorithm required that the bid-ask spread (B/A spread) be lower than 1%, and that the volume of traded shares be above 500,000.

Thereafter, in a fourth substep S14, all the securities that remain in the second group of securities are categorized and sorted by sectors and subsectors, to create sets of categorized securities by device 10. This can be done by using the global industry classification standard (GICS), or other classification standards, and applying the standard to all of the securities in the second group. In a variant, based on expertise of the service provider, a proprietary classification standard can be created. In this substep, the goal is or provide different sets of securities that are independent from each other. For example, one set of securities can be categorized as "Finance" with securities from different traded banks and financial service companies, and one set of securities can be categorized as "Software" with securities of different software companies that are publicly traded within the chosen index. As another example, one set of securities can be categorized as "Pharma," while to other set of securities can be categorized as "Construction." The idea is to create sets of securities that act independently from each other in the public trade. The step S14 of categorizing can also be done before either the step S12 and S13, for example after choosing the index in step S11, or after the forming of the first group in step S12.

Next, in a fifth substep S15, a number n of multiple-choice pools P, for example pools $P_1$ to Pn of securities are created by device 10, that are used for the AFM. In this step S15, a certain number of securities from one and the same set of securities is assigned to each pool, for example for pool $P_1$. For example, securities or shares A, B, C, D, and E that all belong to the same set of securities are assigned to a pool $P_1$. After this substep, (i) pools $P_1$ to $P_n$ will be created to contain a predefined number of securities from the same classification sector and subsector. This allows to create different pools $P_1$ to $P_n$ each having a certain number of different securities from the same set of securities assigned thereto. In this way, each pool is separate and independent from each other. FIG. 11 shows an exemplary embodiment where twelve (n=12) different pools $P_1$ to $P_{12}$ of securities have been created, each pool labelled by a different category of securities, and each pool including five (5) securities from the same set of securities. Moreover, the value of all n pools can be chosen correspond to the weight of each classification sector. For example, a price-weighted index is a stock index in which each stock (i.e. stock or security of General Electric) influences the index (i.e. Dow Jones industrial) in proportion to its price per share. The value of the index is generated by adding the prices of each of the stocks or securities in the index and dividing them by the total number of stocks or securities. Stocks or securities with a higher price will be given more weight and, therefore, will have a greater influence over the performance of the index.

Then, (ii) an initial trading monetary amount M is assigned to each pool P. The initial trading monetary amount M corresponds to at least an amount of cash that will be available for each pool P before starting the AFM. For example, for pool $P_1$ an amount $M_1$ of 250,000$ can be assigned. Next, (iii) the specific quantity of securities or shares that can be purchased with initial trading monetary amount M at a time instant $t_0$ is calculated, for each security, and for each pool, and saved to an reference data set. For this step, purchase prices or asking price for the securities or shares needs to be known, by accessing an e-trading platform and by simultaneously reading a purchase price for each one of the securities in the respective pool P.

As an example, for pool $P_1$, a quantity of shares for each security A, B, C, D, E that can be purchased with amount $M_1$ is calculated by device 10. For this purpose, a purchase or asking price for all securities A, B, C, D, E assigned to pool $P_1$ needs to be known at a specific time instant. This is done by accessing simultaneously, via the electronic trading platform or other online information database, at certain time instant $t_0$ all purchase prices of securities or shares A, B, C, D, E to have a share price at a same time moment. This step is repeated for each pool P. The different pools P of a portfolio can be designed to have the same initial trading amount, but it is also possible to create different pools with different initial trading amounts. An example is given in FIG. 7A. For a pool $P_1$, an initial trading monetary amount $M_1$ is assigned to be $250,000. Next, at time $t_0$, simultaneously a quantity of securities or shares A, B, C, D, E that are assigned to pool $P_1$ that can be purchased with $M_1$ is calculated. As an asking or purchase price per security for each security A, B, C, D, E varies, different quantities of securities result, for example, 5000 shares of security A that costs $50 at time instant $t_0$, 11,364 shares of security B that costs $22 at time instant $t_0$, 4,464 shares of security C that costs $56 at time instant $t_0$, 6,579 shares of security A that costs $38 at time instant $t_0$, and 13,158 shares of security E that costs $19 at time instant $t_0$. This values are all stored in a memory as a reference data set so that they can be used as an initial data set for the AFM trading algorithm, for the time instant $t_0$.

In the variant discussed, five securities (5) are assigned to each pool, but it is possible to assign between 2 to 10 securities from the same set to each pool, preferably between 2 and 6 securities. Also, more than one pool $P_1$ can be subject to the AFM trading algorithm, for example up to and more than fifty (n=50) pools, preferably between n=20 to n=100 pools.

Next, a step of initiating or starting the automated trading is done by device 10, being the sixth substep S16. In a sixth subset S16, step (i) of funding, an initial cash C is made available for a respective pool P, to fund pool P. This can be done by assigning a bank account from bank 80 with liquid assets to each pool P. Generally, the initial cash amount C can correspond exactly to the initial trading monetary amount M, or a cash amount that is higher than M. For example, in the variant shown of FIG. 7A, the initial cash amount $C_1$ is determined to be $M_1$ for pool $P_1$. However, the initial cash amount $C_1$ can also be more than initial trading monetary amount $M_1$, for example an addition of a certain percentage of cash reserve, for example a 5% cash reserve in addition to amount $M_1$.

Next, in the sixth substep S16, in a step (ii) of initial purchasing, a first purchase order is entered via the electronic trading platform by device 10, in which an initial order is entered for a respective pool P. This done by buying a certain quantity of securities or shares from only one of securities A, B, C, D, E of the pool P, by using the initial cash amount C that is assigned to the respective pool. Preferably, this purchase is done at the same or substantially the same time $t_0$, and the quantity of shares purchased from either security A, B, C, D, E corresponds to the quantity calculated in step S15, (iii). The first purchase order can be done by choosing one of security A, B, C, D, E at random by the system, or by starting with one of securities A, B, C, D, E that meets certain purchase criteria. Only one type of security of pool P is purchased in this order. In the example shown in FIG. 7A, security A has been chosen for the initial purchase, and for $250,000 of cash, 5'000 shares of security A are purchased, at time $t_0$. As already mentioned, preferably, the step of calculating a quantity of shares for each security A, B, C, D, E if S15, (iii), and a step S16, (ii) of entering the first purchase order can be done simultaneously at a time $t_0$, or within a short time interval. Moreover, step S16 can be done simultaneously or sequentially an entire portfolio, the portfolio including pools $P_1$ to $P_n$.

Subsequently, the second step S2 of the method can be performed by system 100, in which the AFM procedure is started and continuously performed, in an automated fashion, for example by executing a method by processing device 10. After step S16 of initiating the automated trading, step S2 is performed as an automated trading algorithm based on all the securities that are available in each pool P. In particular, with the automated trading algorithm, the currently purchased security from a selected pool $P_i$ is traded against another, different security from the same pool $P_i$, the security being different from the currently purchased security, if a certain trading criteria is met. For this trading, preferably, the trading algorithm follows the steps described below.

First a substep S21 of S2 is performed, by tracking prices of securities. Starting from time instant $t_0$, an evolution of a price or quote of each security within each pool P is observed by device 10, for example by regularly accessing and gathering data from data services 50, electronic trading platforms 30, and stock exchange 60. For example, starting from time instant $t_0$, a timely evolution of a price or quote of the currently purchased security A is observed and tracked, as well as a timely evolution of a price or quote for all the remaining securities B, C, D and E in pool P that have not been purchased. At the same time, a price or quote of currently purchased security A is compared with the price or quote for all the remaining securities B, C, D and E in pool P, to calculate a ratio or comparison between these securities. This can be done at regular time intervals, at any given time t after $t_0$. With this comparison that is performed by device 10 on a regular basis, an amount of absolute savings is calculated for each security A, B, C, D, E within pool P is calculated, compared to initial time instant $t_0$, and an amount of relative total savings between currently purchased security A, and each one of the remaining securities B, C, D, and E of pool P. This allows to track different relationships between two securities, one being the already purchased security A, and the other ones being all the remaining securities B, C, D, E in the pool P that have not been purchased, also called candidate securities B, C, D, E.

For example, as shown in FIG. 7A at time instant $t_1$, a unit share price for the currently purchased security A has increased by $1 from $50 to $51, which results in a savings of $5000 when comparing with purchase price of $50 per share at time instant $t_0$, given that the quantity of shares that were purchased from A is 5000. Analogously, at the same time instant $t_1$, a unit share price for observed security B has increased by $0.5 from $22 to $22.50, which results in negative absolute savings of $5,681.82 when comparing with purchase price of $22 per share at time instant $t_0$, given that the quantity of shares that would have been purchased at time instant $t_0$ hypothetically would have been 11,364. The time period between $t_0$ to $t_1$ is hereinafter referred to as the tracking period.

Negative savings means that security B was not purchased at time instant $t_0$, so the absolute savings indicated are negative for time instant $t_1$, as they have not been realized. Unit share price for security B has gone up just like unit share price of security A, but percentage-wise, unit share price for security B has gone up relative to unit share price for currently purchased security A, expressed in percentage as relative total savings of −0.3%. This comparison value of the relative total savings is relied upon to trigger sales and purchases of securities, as further explained below. Compared with security A, a value of the relative total savings are negative by −$681,82. This comparison between purchased security A and observed security B means that, would security B have been purchased at time instant $t_0$, instead of security A, the total savings would have been better off by $681.82.

Analogously, at the same time instant $t_1$, a unit share price for observed security C has increased by $0.3 from $56.00 to $56.30, which results in negative absolute savings of $1,339.29 when comparing with purchase price of $56 per share at time instant $t_0$. This is given that the quantity of shares of security C that would have been purchased at time instant $t_0$ hypothetically would have been 4,464. Negative absolute savings means that security C was not purchased at time instant $t_0$, so the calculated absolute savings are negative for time instant $t_1$, as they have not been realized. Unit share price for security C has gone up just like unit share price of security A, but percentage-wise, unit share price for security C has gone down relative to unit share price for security A, the difference being expressed in percentage as relative total savings of +1.5%. Therefore, compared with security A, a value of the relative total savings is positive by +$3,660,71. This comparison between purchased security A and observed security C means that, would security C have been purchased at time instant $t_0$, instead of security A, the total absolute savings would have been worse off by $3,660.71.

Analogously, a unit share price for observed security D has increased by $0.90 from $38 to $38.90, which results in a negative absolute savings of $5,681.82 when comparing with purchase price of $38 per share at time instant $t_0$. This is given that the quantity of shares of security D that would have been purchased at time instant $t_0$ hypothetically would have been 6,579. Negative savings means that security D was not purchased at time instant $t_0$, so the absolute savings indicated are negative for time instant $t_1$, as they have not been realized. Unit share price for security D has gone up just like unit share price of security A, but percentage-wise, unit share price for security D has gone up relative to unit share price for currently purchased security A, expressed in percentage by relative total savings of −0.4%. Compared with security A, a value of the relative total savings is negative by −$921,05. This comparison between purchased security A and observed security D means that, would security D have been purchased at time instant $t_0$, instead of security A, the total savings would have been better off by $921.05.

Analogously, at the same time instant $t_1$, a unit share price for observed security E has increased decreased by $0.2 from $19 to $18.80, which results in positive absolute savings of $2,631.58 when comparing with purchase price of $19 per share at time instant $t_0$. This is given that the quantity of shares of security E that would have been purchased at time instant $t_0$ hypothetically would have been 13,158. Positive absolute savings means that security E was not purchased at time instant $t_0$, so the calculated absolute savings, in this case losses, have not been realized. Unit share price for security E has gone down, unlike all the other securities A, B, C, D, and percentage-wise, unit share price for security A has gone up relative to unit share price for security E, the difference expressed as relative total savings percentage of +3.1%. Therefore, compared with security A, the total relative savings are positive by a value +$7,631.58. This comparison between purchased security A and observed security E means that, would security E have been purchased at time instant $t_0$, instead of security A, the total savings would have been worse by $7,631.58.

A value of the relative total savings is used to trigger a sale of the currently purchases securities A, and to purchase one of candidate securities B, C, D, E, of pool P. The relative total saving basically express differences or divergences of share price or quotes between two securities from a chosen pool of securities, by comparing how the evolved towards each other, from a given starting time point, in the example above at time $t_0$. It does not matter how the market, or the corresponding market index performs, it only tracks differences between an already purchased security, and other securities within a chosen pool. In this respect, the total relative savings does not depend on the global market trends, but tracks divergences within a pool of securities, in the example above securities A, B, C, D, E, that are from the same sector of classification. Therefore, the relative total savings value or percentage is market neutral.

Next, trades within pool P are executed with substep S22 of S2 by device 10. In this substep S22 of trading, while substep S21 is tracking and comparing price of the securities in pool P, all the securities A that have been purchased at time $t_0$ are sold, and with the realized cash amount, a quantity of candidate securities B, C, D, E other than security A within the same pool P is purchased, by choosing the one that meets a trade trigger. The trade trigger is for example when a certain predefined relative savings percentage or value is met, between already purchased security A, and any one of candidate securities B, C, D, E, as discussed above with respect to substep S21 of tracking. For this a ratio or comparison between a price for the already purchased security A and all candidate securities B, C, D, E is repeatedly calculated, and compared to a threshold value. The predefined relative savings percentage or value is also called requested relative savings, and can serve as the threshold value. For this substep S22 of trading, while substep S21 is tracking and comparing the prices of securities, the calculated total relative savings value or percentage is constantly compared with a predefined threshold. In the example shown in FIG. 7A, the predefined threshold as a trade trigger is set to a percentage of 3.0%. At time instant $t_1$, the relative total savings percentage has been met between already purchased security A, and tracked security E within pool P. Generally, this would be the first time instant where the method has detected that a relative total savings percentage or value has met a certain threshold. It is also possible to use a relative total savings value as a trade trigger, for example a specific dollar amount, as explained with respect to FIG. 7B.

Next, at time instant $t_1$, the entire quantity of security A is sold, in the example shown in FIG. 7A, 5000 securities are sold at a price of $51, to generate a realized cash amount of $255,000. Thereafter, with the realized cash amount, still at time instant $t_1$, a quantity of securities that can be purchased of security E is calculated. This is done by dividing the amount of realized cash with the actual purchase price of security E. In the example of FIG. 7A, $255,000 is divided by a share price of $18.79, and this results in a quantity of shares of security E being 13,571. This allows to use all or almost all cash available after the sale of security A to purchase a newly selected security E, to substantially eliminate any cash build-up. Based on time instance to, the initial number of shares E that could have been purchased was 13,158. Next, in substep S22, the calculated quantity of securities from security E is purchased. In the example shown, 13,571 shares of security E are purchased at price $18.79. This finalizes the first trade between a first security and a second security that is different from the first security within the same pool P, after a trade trigger was met. Basically, with substep S22 of trading, the realized cash amount is reinvested in the security that has fared the worst in comparison to the security that was initially invested in.

Thereafter, at the same time instant $t_1$, a substep S23 of calculating is performed, in which a second or reverse order calculation is performed by device 10. This reverse order calculation is also performed in an automated fashion by device 10. Basically, the reverse order does not make an actual purchase or trade, as a new quantity of securities E have already been purchased, but calculates a new reference base for the time instant $t_1$ for all securities that are within pool P, and stores these values in the reference data set. This allows to track an evolution of a price or quote of securities again, and compare them, as discussed in substep S21 of tracking, but this time based on the new start time base $t_1$ instead of to. The step is equivalent with step S15, substep S23 when the initial data set for to is provided. It is clear that the initial data set generated in step S15, substep S23 is not valid anymore for a new performance of substep S21 of tracking in step S2, to track the evolution of a price or quote of each security within each pool P. Substep S23 of calculating uses the realized cash amount of substep S22, and calculates, for time instant $t_1$, which quantity of shares could have been bought for each of the remaining shares in pool P. In the example shown in FIG. 7A, while 13,571 of security E have been purchased with the realized cash amount $255,000, at that same time instant $t_1$ it would have been possible to purchase 4999 shares of security A, 11,328 shares of security B, 4,529 shares of security C, and 6,554 shares of security D, at the asking prices of $51.01, $22.51, $56.31, and $38.91 per share, respectively. While these purchases are not effectuated, these values for the number of shares that could have been purchased at time instant $t_1$ and the respective share price at time instant $t_1$ are stored into the reference data set.

The conditions for the trade trigger can be set either as part of step S16 when the automated trading is initiated or set-up, or can be defined each time step S2 is performed, and the substep S21 of tracking is started or before it is started. For example, a user, operator, or trader 20 can define a requested total savings percentage or a requested total savings amount, or both. Also, an operator 20 can define rules for the trade trigger, for example that both a requested total savings percentage and a requested total savings amount need to be met before triggering a trade wot substep S22 of S2, or that only one of each can be met to trigger a trade. In a variant, it is also possible that the requested total savings amount be expressed as a percentage of the cash that was initially available with substep S16, step (i) of funding, and every time cash is realized in S2, trading step S22, this requested total savings amount can be recalculated.

After substeps S21 of tracking, substep S22 of trading, and substep S23 of calculating of step S2 of the AFM have been performed, these steps are repeated. Starting at time instance $t_1$, the step S21 of tracking compares all prices or quotes of candidate securities A, B, C, D, against the purchased security E, and compares the relative total savings of each comparison with a trade trigger, for example a threshold value for the relative total savings percentage. Note that the set of candidate securities has changed, including now security A, but excluding purchased security E. Once the trade trigger has been met at a time instance $t_2$, step S22 of trading is performed where the already purchased securities E are sold, and a realized cash amount is generated, to purchase a quantity of candidate securities of either A, B, C, D that has met the trade trigger, for example the threshold value of 3% of relative total savings as compared to time instant $t_1$. In the example shown in FIG. 7A, at time instant $t_2$, a relative total savings percentage of 3.1% has been achieved with security B. Therefore, all 13,571 securities E are sold at the actual price 19.17, to make a total amount of $260,157 of realized cash amount. With this realized cash amount, a total of 11,715 shares of security B are purchased, at a price of $22.25 per share. Next, substep (iii) of calculating is performed, in which a new reference data set is created, this time for time instant $t_2$.

For each pool P, the substeps S21, S22, S23 of step S2 can be repeated, until the method is stopped. Step S2 with substeps S21, S22, and S23 can be performed on device 10 by a software code, and can access an API 32 of an electronic trading system 30 for the interactions with the market index and the securities. With step S16, step (i) of funding, and step (ii) of making an initial purchase of the funds, the automated trading with step S2 can be initiated with device 10, in parallel for the entire portfolio having a certain number of pools $P_1$ to $P_n$.

As discussed above. FIG. 7A shows an exemplary trading example performed by step S2, substeps S21, S22, and S23, at three exemplary time instances $t_0$, $t_1$, and $t_2$. Each time a trade is done and shares are sold, the quantity of the shares to be purchased from either security in pool P is automatically calculated in substep S23 of S2, also called auto-quantity feature. FIG. 7B shows an exemplary some trades and calculations that can be done by device 10 in the step S2, showing a variant where a user has made requested total savings percentage and total savings amount in dollars, a variant in which dividends are taken into account for the trade of securities during the tracking period, and a variant where the underlying stock has been split during the tracking period.

FIG. 8 shows an additional aspect of the method, the aspect being used as an algorithm to calculate a quantity of securities, when any one of the steps needs to calculate a quantity of shares of any security that can be bought with a certain amount of cash. For example, this feature can be used in trading step S22 of S2 when the number of shares to be purchased needs to be calculated, or for each reverse order calculation made in the calculation step S23 of S2, when the quantity for all securities A, B, C, D, E in pool P needs to be calculated to create a new reference data set. This algorithm is performed to achieve better savings. With this additional trading algorithm, based on the realized cash amount, first the exact quantity of shares of the securities from pool P is calculated based on the current market purchase price. In the example shown, 1,227 shares of a security can be purchased at a share price of $22, with the cash amount of $27,000. Next, the algorithm calculates the quantity of shares that have to be purchased, by dividing the quantity of shares by 100, by rounding the resulting number to the next integer value, and by multiplying the number by 100, to receive the actual quantity of securities that should be purchased. This rounding method to generate the purchase quantity of securities allows to avoid certain fees for the purchase of an usual number of shares. Excess cash that will not be used in the actual purchase can be funded back to a trading bank account.

In parallel to the performance of second step S2 of automated trading by applying the trading algorithm with substeps S21 of tracking, S22 of trading, and S23 of calculating, a third step S3 of monitoring can be performed by device 10, in which a monitor is activated that is operated by device 10 of system 100, or by another computing device of system 100, allowing to observe the evolution of the securities, changes to the securities, and the underlying securities index, to detect abnormal situations. These can include incidents relating to the stock exchanges themselves, such as trading stops by the NYSE, LSE, DAX, etc., incidents relating to stocks within the pools $P_1$ to $P_n$ of the portfolio or unexpected events which cause a particular stock to unexpectedly rise or fall. Should this occur, further trading of a particular security or the entire trading for the affected portfolio or only by the affected pool P performed by the system 100 can be deactivated and an appropriate warning or alert message can be generated, that can be further processed by a user 20 of the system 100. Certain abnormal occurrences can be detected and accounted for by the system 100, while others can be handled manually once the user has been notified by such warning or alert message.

The third step S3 of monitoring is performed simultaneously with the second step S2 of automated trading. The third step S3 of monitoring can also include the step of trailing trigger S31 and the step of rescheduling S32 for each pool that is under automatic trading by step S2. In addition, with step S3, system 100 can also automatically detect and compensate for dividend payments related to a security, splits of a security. However, it is possible that certain unforeseeable events like sudden decline of a security, trading stops of a security, etc. generate a warning message that requires user intervention. These abnormalities can be monitored by monitoring criteria in the form of rules and algorithms, for example but not limited to the monitoring of rapid value increases and declines above a certain threshold value, the monitoring of unusually low or high trading volumes above a certain upper boundary threshold or below a certain lower boundary threshold, withdrawal of certain securities from trading. Moreover, step S3 can also monitor the overall performance of the portfolio, and can alert the user 20 when certain performance criteria have been met, for example a relative increase of the overall value over a time period, or an absolute increase to a certain monetary value.

Next, with step S4 of stopping the trading, the method of automatic fund management can be stopped or terminated at any time based on different criteria. With the execution of step S4, all trading of securities in the portfolio of user, investor, or operator 20 are stopped. For example, termination of the automatic trading can be done by the user manually, for example upon reception of an alert from the step of monitoring S3, or can be done automatically by processing device 10 for example when a predefined user-defined performance criteria has been met. Next, in the termination step S4, it is possible to stop any further trades, and to sell off all the securities of all the pools $P_1$ to $P_n$ in portfolio, or to sell off all securities of one or several pools P, to create a new cash position that represents the entire portfolio, or a new cash position for one or several pools P. These cash positions can thereafter be transferred to a bank or fund manager for further trading.

In the context of the embodiments of the present invention, as discussed above, an exemplary pool P was discussed with securities A, B, C, D, E assigned thereto, and securities A, B, C, D, E all belong to the same set of securities as defined by step S14, and these sets have been defined for categorizing or classifying securities into a certain GICS sector and if possible, a certain industry group. However, it is noted that having five securities A, B, C, D, E is only exemplary, and it is possible to have a different number of securities in each group, preferably between 2 and 6 different securities. Also, the use of GICS standard is exemplary, other standards may be used.

Figure 4:
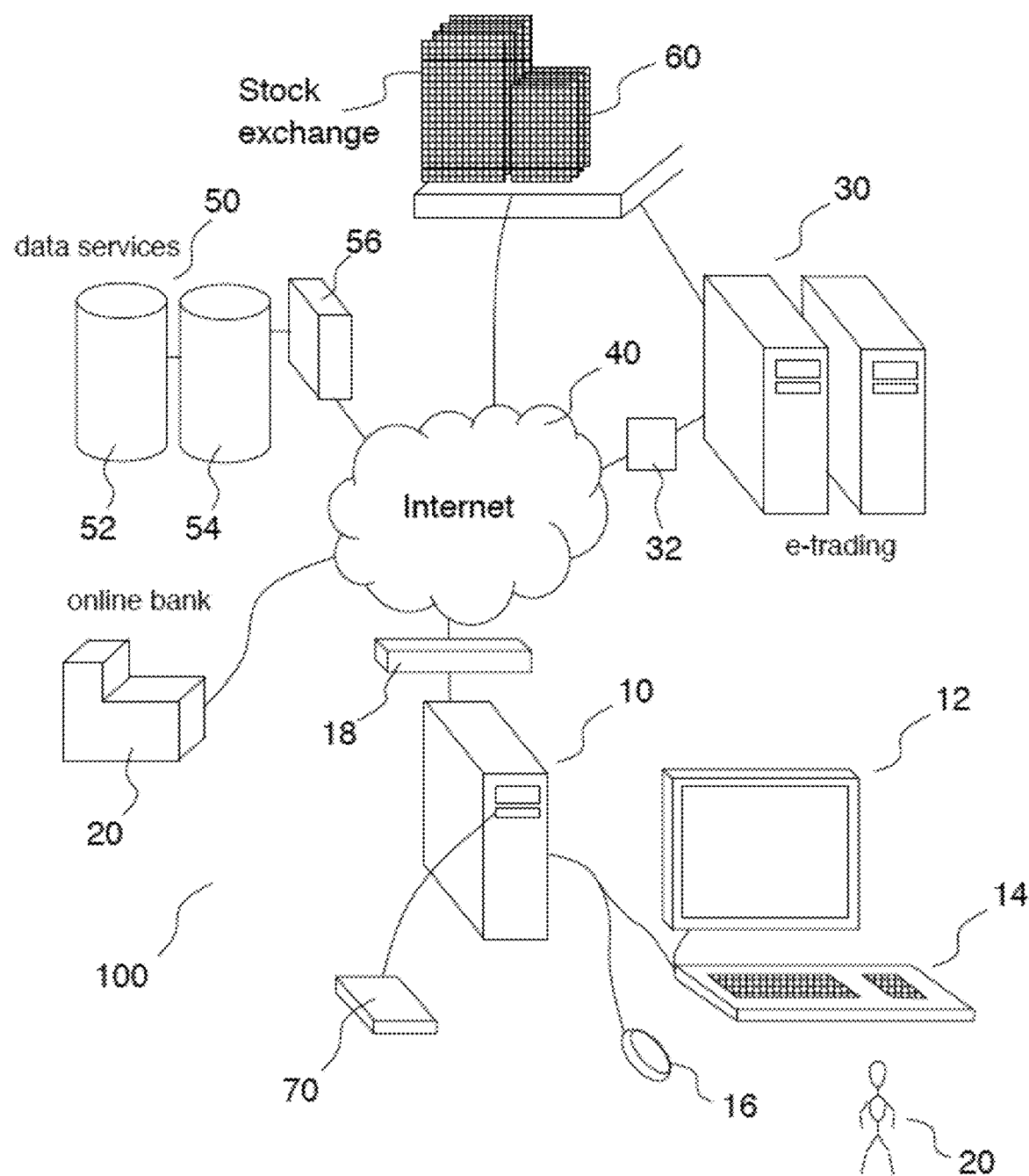
FIG. 4 shows a schematic representation of the system for performing the autonomous fund management according to another aspect of the present invention.

FIG. 4 shows an exemplary embodiment of the system 100 that can perform the automated fund management as described above. Processing device 10, having one or several hardware processors and storage memory, is configured to process computer readable instructions, and the computer instructions, when performed on the processors of processing device 10, can perform a method of autonomous fund management. Processing device 10 can be in the form of a personal computer (PC), Macintosh computer, remote server, cloud based server, and can be connected via a secured firewall 18 online to the Internet 40. Processing device 10 is also connected to data output devices like a monitor 12, printers, tablets, smart phones, to visualize data and performance to a user 20, and can also be connected to input devices like a mouse 16, trackpad, or keyboard 14 so that the user can manually enter data and provide instructions. For example, monitor 12 can be used to alert user of certain trading abnormalities, in the form of a prompt, email, or other notifications. A non-transitory computer readable medium 70, for example a portable hard disk, flash disk, universal serial bus (USB) drive, CD-ROM, BluRay™ disk, DVD disk, can be used to store a computer program thereon, and the computer program can be made of computer instructions that are configured to perform the method for autonomous fund management, when the computer program is executed on the processing device 20 of system 100. Processing device 20 is equipped with a reader or port for accessing and storing the computer program on the medium 70.

Moreover, different data service providers 50 are also connected to the Internet 40 and can provide for data services that are used by the system 100. For example, certain securities-related service data can be stored in databases 52, 54 and the data can be managed and made accessible with a processing device 56 to the Internet 40, for example via online databases or APIs. For example, online services of different public data service providers can be accessed, for example the ISIN to monitor changes in the ISIN registrations, online services of the SEC and other securities regulatory agencies can be accessed, to monitor changes and alerts related to securities, online services of different private data service providers can be accessed, for example the Morgan Stanley Capital International (MSCI) data service, Standard & Poor's (S&P) data services, for example to access GICS information, so that data from these services can be transferred via the Internet 40 to processing device 10 for the use and analysis in system 100.

Moreover, an e-trading service 30 having a data processing device can also be accessed by the processing device 10 via the Internet 40 and an API 32, to effectuate securities purchases and trades for a stock exchange 60. Exemplary e-trading services 30 can be, but are not limited to E-Trade Financial™, Optionshouse™, TD Ameritrade™, Cybertrader™. These e-trading services 30 can be used together with their traditional banking services for account management, or an external banking service that is independent from the e-trading service 30 can be used, for example online bank 80 that also offers online banking via the Internet 40. Processing device 10 is configured to operate instructions for securities purchase and sale orders based on the API 32 that is defined by the e-trading service 30.

Figure 5A:
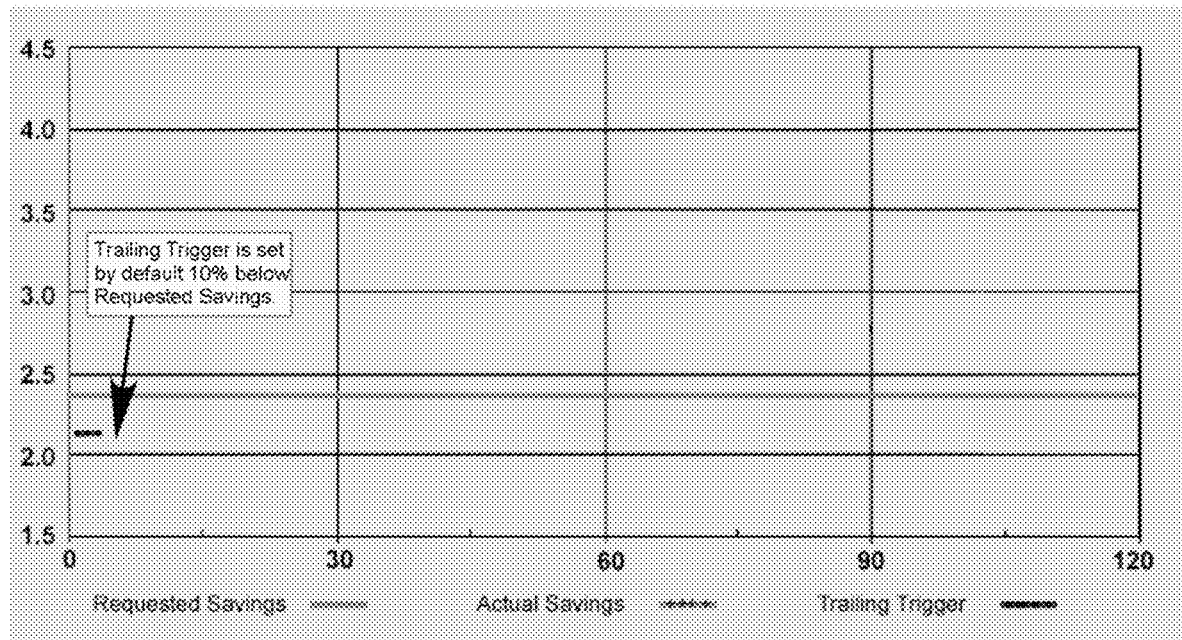
FIGS. 5A-5D shows different charts and a flowchart of the operation of a trailing trigger for triggering a trade of yet another aspect of the present invention.

Another aspect of the embodiments of the present invention is the use of a trailing trigger algorithm for executing delayed trades, as explained with respect to FIGS. 5A.5D. This trailing trigger delays trade decisions as compared to an already existing trade trigger that are based on the trading substep S22 of step S2. The trailing trigger is an additional feature of the trading algorithm of substep S22 performed with step S2 that allows to create greater savings, as compared to a trade that would be performed with the trade trigger in substep S22, during a certain time period of the trading, for example the trade trigger of the above discussed example of 3% percentage of total relative savings, also shown in FIG. 7A. The trailing trigger can be part of step S3 of monitoring, for example step S31 that monitors the step of tracking S21 from the automated trading S2.

Figure 5B:
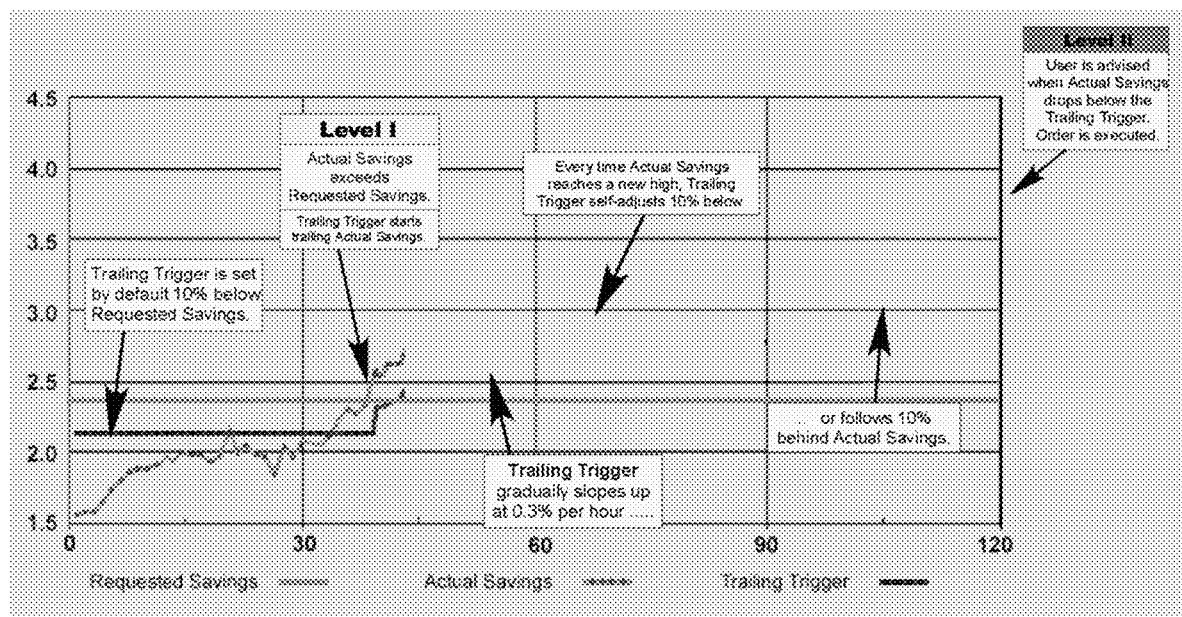
Figure 5C:
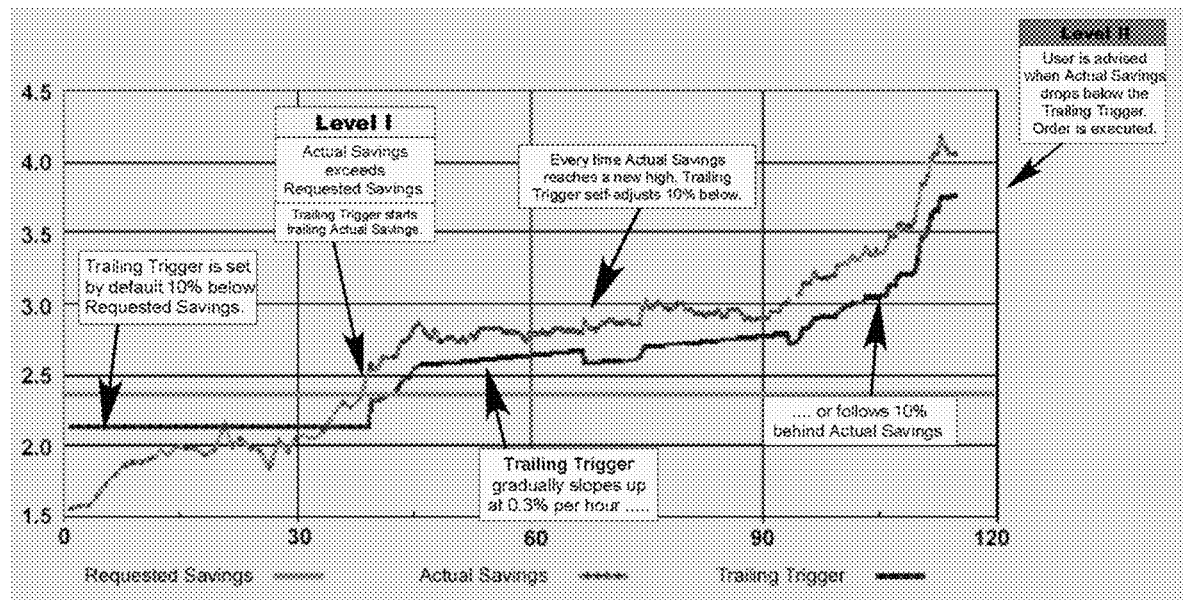

In FIGS. 5A-5C, a comparative timely evolution graph of a price or quote of an already purchased security A is shown in comparison to a price of quote of a candidate security for purchase B, C, D, E, the comparison being shown in percentages, along a time line with time instances 30, 60, 90, 120. The ratio graph represents the actual total relative savings. In addition, the requested relative saving percentage is shown at a constant level at about 2.4%, and in FIG. 5A, a trailing trigger is shown about 10% at about 2.16%, shown with the black line. The value of the trailing trigger can be set by operator, in the variant shown it is set to 10%, but this value can be different. Without the trailing trigger feature, substep S22 of step S2 will trigger a trade to sell all securities A and to buy a candidate security when the actual savings reaches the requested savings, in the example shown 2.4%. In the example shown, at the start of the trading at minute zero (0) the trailing trigger is set at 10% below the requested relative total savings. Next, as shown in FIG. 5B, with the evolution of time during the tracking of the trading with step S2, substep S21, the trailing trigger is increased to Level I by step S31, at the time instant when the actual savings would become higher than the requested savings. In other words, instead of triggering a trade with substep S22, step S2, no trade is yet triggered, and the evolution of the requested savings expressed in the comparative graph is further tracked, and the trailing trigger level is increased to a level of the actual savings. Also, with the trailing trigger algorithm, at this time instant, device 10 can generate an alert to notify operator 20 of the fact that the actual savings are above the requested total relative savings for the particular trade, shown that the ratio graph being above requested savings level of 2.4%.

Figure 5D:
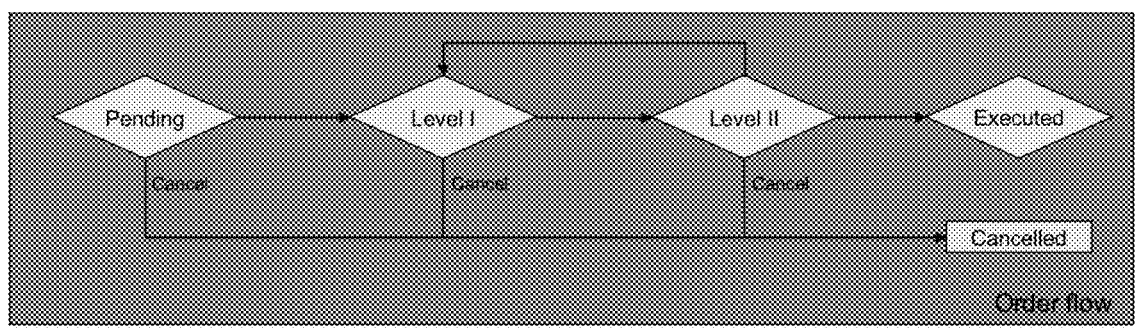

Starting from the time moment Level I has been reached by the ratio graph reaching the requested savings level, after the trailing trigger has been place to the same level of the requested savings level, the trailing trigger can be gradually increased by the algorithm of device 10 by a predefined rate, for example but not limited to a rate of 0.3%/hour, or could continue to follow 10% behind the current value of the actual savings, as long as the actual savings are still increasing. Typically, if the actual savings increase above the initially requested savings (i.e. 2.4%), the trailing trigger can be set to follow the actual savings below a certain percentage, for example 10%, and at the same time, can be set to not to decrease when the actual savings drops. Thereafter, once the actual savings drops below the trailing trigger savings percentage, the trade of the securities can be executed, by executing step S2, substep S22 of trading. This is shown as Level II in FIG. 5C. In the variant shown, the trailing trigger achieved a save percentage of 3.75% instead of the requested initial savings of 2.4%. The trailing trigger algorithm can run in parallel with step S2, substep S21 by device 10, and allows to take advantage of a situation where there is a strong divergence between securities that are within the same pool P. FIG. 5D shows an exemplary flow chart of the execution of the trade by step S2, substep S22 as a function of the actual savings reaching Level I and Level II, the level or threshold being adjusted by the step S31 of the monitoring step S3. After execution of the trade or order, the system 100 can immediately perform the calculation of the amount of securities of substep S23 of calculating.

Moreover, according to yet another aspect of the embodiments of the present invention, the trading algorithm can also include a step of rescheduling a trade S32. The step of rescheduling allows to apply a rescheduling rule for rescheduling trades that have not been performed during a certain time period. For example, when the step of tracking, with step S2, substep S22 of trading is performed, the step of rescheduling S32 can be performed in parallel, for example, as part of the step S3 of monitoring. Sometimes, the evolution of the stock market and the securities within a pool are such that the requested savings are not achieved, and will not be achieved for a long time. This means that the step of tracking of S2, substep S21 could run for a long time without that a trade is executed by substep S22. It is also possible that only negative savings will result during some time period of trading, for example, when the purchased stock declines, while all other candidate stock rise. For such situations, a rescheduling step S32 can be activated and performed by the processing device 10. For example, rescheduling step S32 can follow a rule such that when after a certain defined time period of trading, for example a fixed duration like a part of a trading day, one or more trading days, the requested savings that are used in substep S21 of tracking are not be met, the rescheduling rule can take place. This rule signifies that the same pending trade that is tracked by substep S21 is cancelled by intervention of step S32, and a new pending trade is entered with substep S21 at a time moment $t_R$. However, as a new reference for tracking savings, a new reference data set for time moment $t_R$ is done, by substep S23. Assuming that security A is the currently purchased security, this step calculates what quantity of candidate securities B, C, D, E, could be purchased at time instant $t_R$, based on a current value of the purchased securities A.

Once the reschedule rule has been triggered, the rescheduling step calculates the to-go savings, the to-go savings being the actual savings at the time instant $t_R$ minus the requested savings that were used in substep S21. A first execution reschedule can be performed to make the trade. The first execution reschedule rule is set when (a1) the pending trade order of substep S21 has been pending for a tracking period of three (3) days or more, (b1) the lowest to-go savings that was observed during the tracking period was lower than the requested savings, and (c1) the requested savings average of the three days of the tracking period were lower than zero (0). When (a1), (b1), and (c1) can be observed by device 10 with rescheduling step S32, the first criteria for execution reschedule has been met, and the pending order or trade that is defined in substep S21 is executed with substep S22.

A second execution reschedule will execute the order with the lowest to-go savings. A second execution reschedule rule of a trade can be set when (a2) the pending trade order of substep S21 has been pending for a tracking period of six (6) days or more without the occurrence of any reschedule, and (b2) the lowest observed to-go savings during the tracking period was lower than the requested savings. When (a2) and (b2) can be observed by device 10 with rescheduling step S32, the second criteria for execution reschedule has been met, and the order or trade that was defined in substep S21 is executed with step S22.

A reschedule without execution can be performed based on a rule of a trade to reenter the order at the current market conditions, with no changes to the order. This rule can require that (a3) the pending trade order of substep S21 of step S2 has been pending for a tracking period of six (6) days or more without the occurrence of any reschedule, and (b3) the lowest observed to-go savings during the tracing period was greater than the requested savings.

TABLE I

| | Days after order entry | Conditions |
|---|---|---|
| Execution Reschedule 1 | 3 | 1 to-go < requested savings |
| | | 3 to-go < 0 |
| Execution Reschedule 2 | 6 | 1 to-go < requested savings |
| Reschedule | 6 | All to-go > requested savings |

FIG. 9 shows an example of a table that can be used as a master security file, and can be created as metadata that is appended or linked to each security of the first group, so that a filtering can be applied to this data, for generating securities from the second group that will be categorized into multiple choice pools A, B, C, D, E. This data can be gathered from the e-trading service 30 or from the data services 50. In some instances, the data can be gathered directly from the stock exchange 60. FIG. 10 shows a table that is attached to each order or trade, having the exact information that is required to execute a trade via an API of a e-trading service 30.

Figure 12:
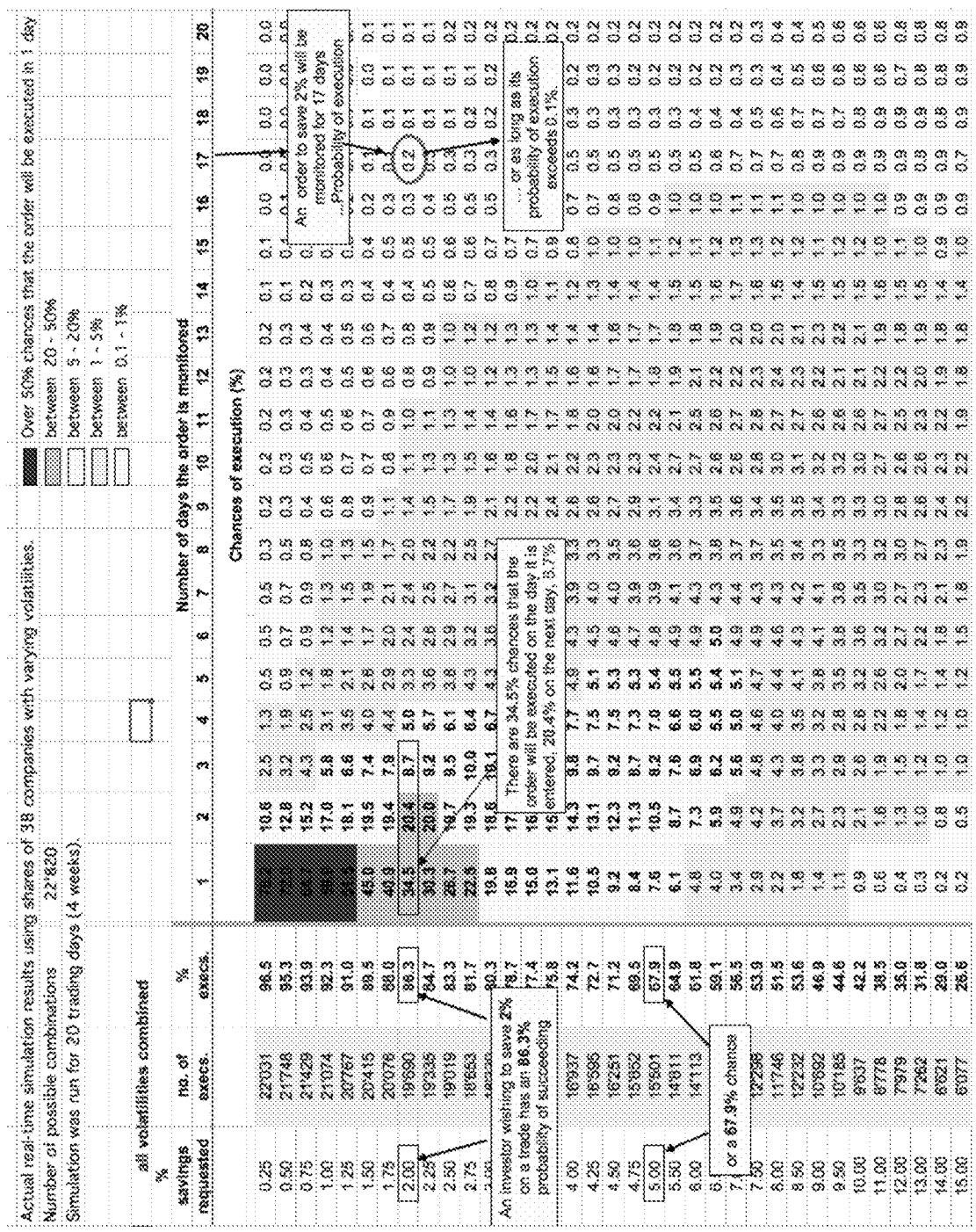
FIG. 12 shows a chart with experimental data on probabilities of an execution of an order.

FIG. 12 shows experimental results of the system, to determine the saving probabilities based on a predetermined amount for the requested savings. It can be seen that a user that wishes to save 2% on a trade has an 86.3% percentage chance that such trade will actually happen. The simulation was run for twenty (20) trading days with shares of 38 different securities that were shares of companies. Also, the timely evolution of the pending trades are shown, up to twenty (20) days after the monitoring of the pending order started.

Figure 13:
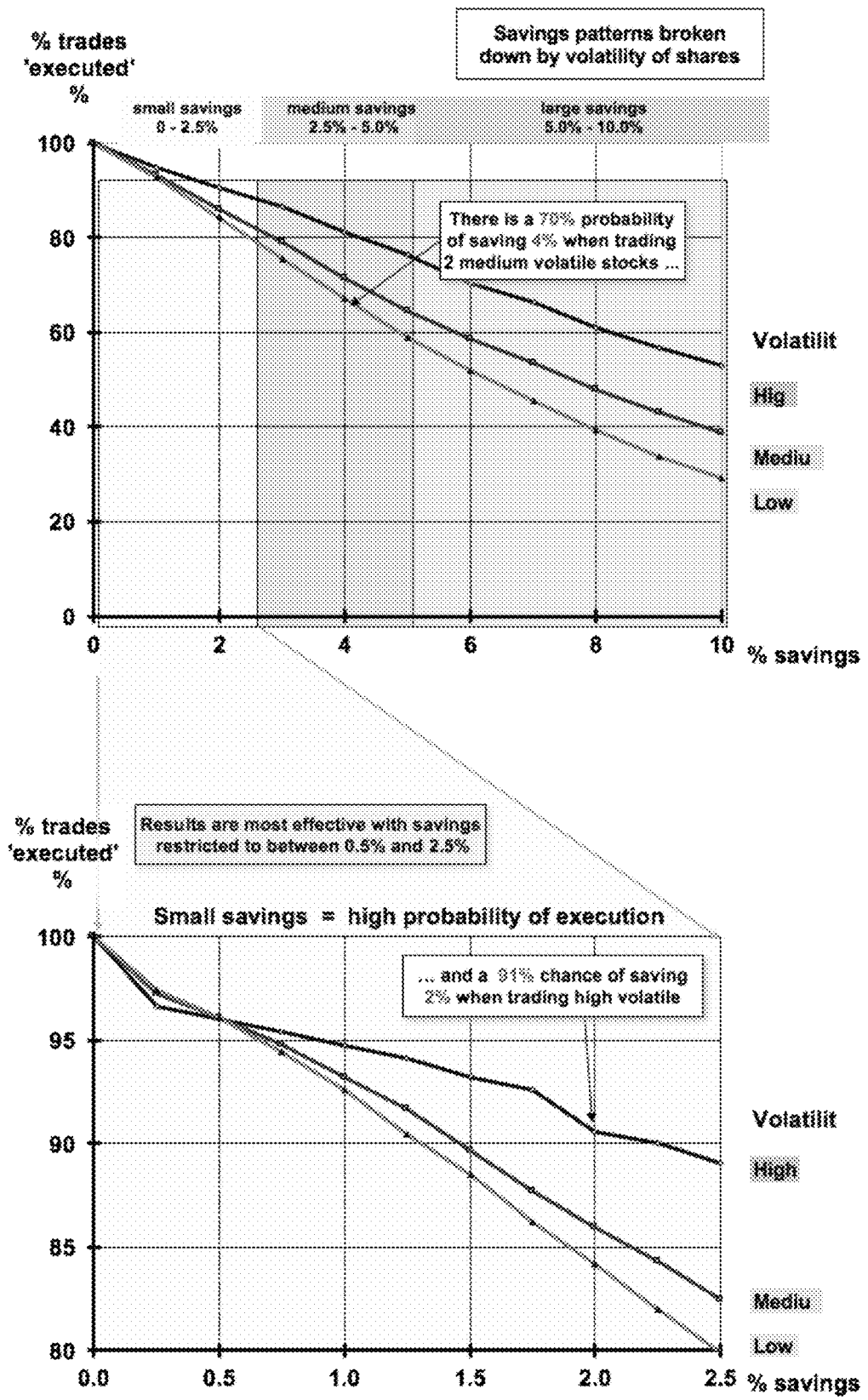
FIG. 13 shows charts comparing probabilities of executed trades versus savings percentages.

FIG. 13 shows charts showing additional simulation results of the system 100 showing executed trades as a function of saving percentages requested, and different curves are presented with stock of different volatility. The charts show that by requesting a smaller savings percentage, the probability of executing sales is higher, which results in more trades being executed. For example, when serving percentages between 0.5% and 2.5% are pursued, results are more effective, as the chances of triggering a sale would be over 80%.

Figure 14:
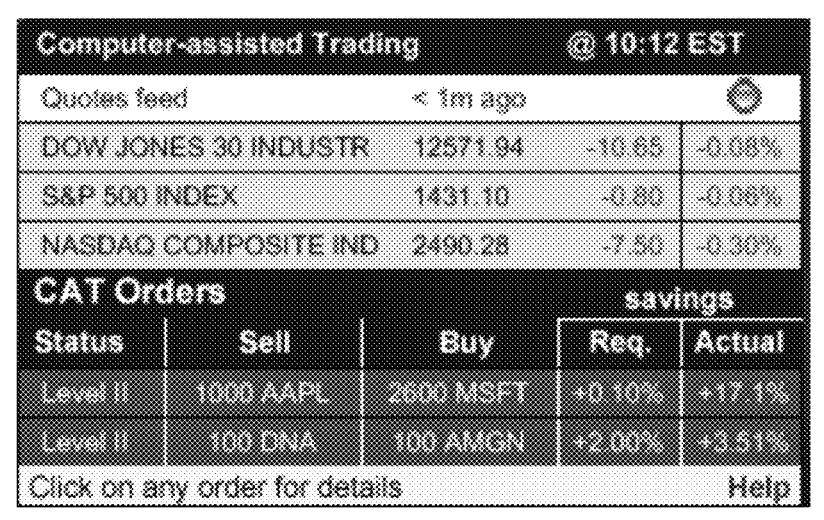

FIG. 14 shows a screen shot from a prompt or a message of a graphical user interface generated by processing device 10 and displayed on monitor 12 for operator 20, showing information related to the requested saving and the actual savings of pending trades, for example with the purpose to alert the user of a certain level of savings that are above the requested savings. Two pending trades or orders are shown, indicating the quantity of the securities that are to be sold and to be purchased, with the associated requested and actual savings. Both pending trades or orders have reached Level II, where the actual savings have dropped below the trailing trigger level, so that the orders or trades will be executed. The trade can be triggered automatically by device 10, or can be executed manually by operator 20 upon reviewing the prompt. On the message, three major trading indexes are also shown, the Dow Jones, S&P 500, and the Nasdaq Composite, serving as a comparative to the actual performances of a trade.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

The invention claimed is:

1. A method for a computer-based autonomous fund management, the method operated on a computer having access to an internet, the method comprising:
   accessing a portal of an online trading service via an application program interface by the computer, the online trading service permitting a sale and a purchase of securities;
   selecting a certain number of securities from securities available at the online trading service create a first group of securities from a publicly traded index;
   discarding securities from the first group based on filter criteria to create a second group of securities;
   categorizing the securities from the second group of securities to assign the securities to different industry sectors;
   grouping a predefined number of the categorized securities into a number n of security pools, such that each security in a same security pool is categorized to a same industry sector;
   trading securities within the security pools by performing a security sale and/or a purchase via the portal of the online trading service during a trading period, such that a first quantity of a first security within a pool is sold and a second quantity of a second security within the pool is purchased when a trade trigger is met, the trade trigger being met when a ratio between a price of the first security and a price of the second security reaches a predefined threshold; and
   rescheduling the trading instead of trading the securities, when in the trading the securities it is determined that the trade trigger has not been met for a predetermined amount of time.

2. The method according to claim 1, wherein the categorizing uses a standardized securities classification scheme.

3. The method according to claim 1, wherein the filter criteria discards securities with a volatility that is above a predetermined threshold and discards securities with a publicly tradable volume that is below a predetermined volume.

4. The method according to claim 1, wherein the trading further comprises:
   selling the first quantity of the first securities from the pool to generate a first cash amount;
   calculating the second quantity of the securities from the second security from the pool based on the first cash amount, the first security being different from the second security; and
   buying the calculated second quantity of second securities from the pool.

5. The method according to claim 4, wherein the trading further comprises:
   calculating a quantity of each security within the pool that could be purchased with the first cash amount, and saving the quantity of each security in a data set.

6. The method according to claim 1, further comprising:
   before the trading securities,
   observing a purchase price of the first security from the pool, observing a sales price of the second security from the pool;
   comparing the purchase price with the sales price during the observing to determine a level of actual savings between the first and the second security; and increasing a level of the predefined threshold of the trade trigger upon reaching a predetermined level of savings in the level of actual savings determined in the comparing.

7. The method according to claim 6, wherein
performing the trading securities when in the observing the level of actual savings drops below the increased level of the predefined threshold of the trade trigger.

8. The method according to claim 1, further comprising:
observing a purchase price of the first security from the pool, observing a sales price of the second security from the pool;
comparing the purchase price with the sales price during the observing to determine a level of actual savings between the first and the second security; and
comparing the level of the actual savings with the trade trigger,
wherein the rescheduling the trading securities is performed when an average level of the actual savings over the predetermined amount of time is lower than zero.

9. A system for computer-based autonomous fund management, the system comprising:
a computer having access to an internet; and
a display screen,
the computer configured to:
access a portal of an online trading service via an application program interface by the computer, the online trading service permitting a sale and a purchase of securities;
select a certain number of securities from securities available at the online trading service to create a first group of securities from a publicly traded index;
discard securities from the first group based on filter criteria to create a second group of securities;
categorize the securities from the second group of securities to assign the securities to different industry sectors;
group the categorized securities from the second group of securities into a set of security pools, each security in a same security pool assigned to a same category of securities;
during a trading period, trade securities within the security pools by performing a security sale and/or a purchase via the portal of the online trading service, such that a first quantity of a first security within a pool is sold and a second quantity of a second security within the pool is purchased when a trade trigger is met, the trade trigger being met when a ratio between a price of the first security and a price of the second security reaches a predefined threshold; and
reschedule the trade instead of trade the securities, when in the trading securities it is determined that the trade trigger has not been met for a predetermined amount of time.

10. The system according to claim 9, wherein the computer is further configured to
categorize the securities by using a standardized securities classification scheme.

11. The system according to claim 9, wherein the filter criteria discards securities with a volatility that is above a predetermined threshold and discards securities with a publicly tradable volume that is below a predetermined volume.

12. The system according to claim 9, wherein during the trading of the securities, the computer is further configured to sell a predetermined amount of the securities from the first pool to generate a first cash amount;
calculate the second quantity of the securities from the second security from the pool based on the first cash amount, the first security being different from the second security; and
buy the calculated second quantity of second securities from the pool.

13. The system according to claim 12, wherein during the trading of the securities, the hardware computer is further configured to:
calculate a quantity of each security within the pool that could be purchased with the first cash amount, and saving the quantity of each security in a data set.

14. The system according to claim 9, wherein the computer is further configured to:
before trading securities,
observe a purchase price of the first security from the pool and observe a sales price of the second security from the pool;
compare the purchase price with the sales price during the observing to determine a level of actual savings between the first and the second security; and
increase a level of the predefined threshold of the trade trigger upon reaching a predetermined level of savings in the level of actual savings determined in the comparing.

15. The system according to claim 14, wherein the computer is further configured to:
perform the trading of the securities when in the observing the level of actual savings drops below the increased level of the predefined threshold of the trade trigger.

16. The system according to claim 9, wherein during the rescheduling, the computer is further configured to:
observe a purchase price of the first security from the pool, observe a sales price of the second security from the pool;
compare the purchase price with the sales price during the observing to determine a level of actual savings between the first and the second security; and
compare the level of the actual savings with the trade trigger,
wherein the rescheduling of the trading securities is performed when an average level of the actual savings over the predetermined amount of time is lower than zero.

17. A non-transitory computer readable medium having computer instructions recorded thereon, the computer instructions configured to perform a method for a computer-based autonomous fund management when executed on a computer, the computer having access to an internet, the method comprising:
accessing a portal of an online trading service via an application program interface by the computer, the online trading service permitting a sale and a purchase of securities;
selecting a certain number of securities from securities available at the online trading service to create a first group of securities from a publicly traded index;
discarding securities from the first group based on filter criteria to create a second group of securities;
categorizing the securities from the second group of securities to assign the securities to different industry sectors;

grouping a predefined number of the categorized securities into a number n of security pools, such that each security in a same security pool is categorized to a same industry sector;

trading securities within the security pools by performing a security sale and/or a purchase via the portal of the online trading service during a trading period, such that a first quantity of a first security within a pool is sold and a second quantity of a second security within the pool is purchased when a trade trigger is met, the trade trigger being met when a ratio between a price of the first security and a price of the second security reaches a predefined threshold; and rescheduling the trading instead of trading the securities, when in the trading the securities it is determined that the trade trigger has not been met for a predetermined amount of time.

18. The non-transitory computer readable medium according to claim 17, the method further comprising:

before the trading securities, observing a purchase price of the first security from the pool, observing a sales price of the second security from the pool;

comparing the purchase price with the sales price during the observing to determine a level of actual savings between the first and the second security; and increasing a level of the predefined threshold of the trade trigger upon reaching a predetermined level of savings in the level of actual savings determined in the comparing.

19. The non-transitory computer readable medium according to claim 17, the method further comprising:

observing a purchase price of the first security from the pool, observing a sales price of the second security from the pool;

comparing the purchase price with the sales price during the observing to determine a level of actual savings between the first and the second security; and comparing the level of the actual savings with the trade trigger, wherein the rescheduling of the trading securities is performed when an average level of the actual savings over the predetermined amount of time is lower than zero.

20. The method according to claim 6, further comprising:

displaying and updating the level of actual savings and the predetermined level of savings on a graphical user interface.

* * * * *